United States Patent
Lacaze et al.

(10) Patent No.: US 9,519,286 B2
(45) Date of Patent: Dec. 13, 2016

(54) DELAYED TELOP AID

(71) Applicants: Alberto Daniel Lacaze, Potomac, MD (US); Karl Murphy, Rockville, MD (US); Karl Kluge, Montgomery Village, MD (US)

(72) Inventors: Alberto Daniel Lacaze, Potomac, MD (US); Karl Murphy, Rockville, MD (US); Karl Kluge, Montgomery Village, MD (US)

(73) Assignee: Robotic Research, LLC, Gaithersburg, MD (US)

( * ) Notice: Subject to any disclaimer, the term of this patent is extended or adjusted under 35 U.S.C. 154(b) by 0 days.

(21) Appl. No.: 14/219,834

(22) Filed: Mar. 19, 2014

(65) Prior Publication Data

US 2014/0324249 A1    Oct. 30, 2014

Related U.S. Application Data

(60) Provisional application No. 61/803,440, filed on Mar. 19, 2013.

(51) Int. Cl.
G05D 1/00    (2006.01)

(52) U.S. Cl.
CPC .... G05D 1/0038 (2013.01); *G05D 2201/0207* (2013.01)

(58) Field of Classification Search
CPC .................................................. G05D 1/0038
USPC ........................................................... 701/2
See application file for complete search history.

(56) References Cited

U.S. PATENT DOCUMENTS

| | | | | |
|---|---|---|---|---|
| 7,773,799 B2* | 8/2010 | Oldroyd | ................ | G01C 11/00 382/106 |
| 8,107,722 B2* | 1/2012 | Oldroyd | ................ | G01C 11/00 382/106 |
| 2006/0274171 A1* | 12/2006 | Wang | ...................... | G06K 7/14 348/294 |
| 2007/0127101 A1* | 6/2007 | Oldroyd | ................ | G01C 11/00 359/24 |
| 2009/0276105 A1* | 11/2009 | Lacaze | ................ | G05D 1/0206 701/2 |
| 2010/0241289 A1* | 9/2010 | Sandberg | ............... | B25J 9/1689 701/2 |
| 2011/0007948 A1* | 1/2011 | Oldroyd | ................ | G01C 11/00 382/106 |

(Continued)

*Primary Examiner* — Rodney Butler
*Assistant Examiner* — Frederick Brushaber
(74) *Attorney, Agent, or Firm* — White-Welker & Welker, LLC; Matthew T. Welker, Esq.

(57) ABSTRACT

The proposed system, Delayed Telop Aid (DTA), improves the teleoperator's ability to control the vehicle in a three step process. First, DTA predicts robot motion given the operators commands. Second, DTA creates synthetic images to produce a video feed that looks as if the robot communication link had no delay and no reduced bandwidth. Finally, DTA performs closed loop control on the robot platform to ensure that the robot follows the operator's commands. A closed loop control of the platform makes sure that the predicted pose after the delay (and therefore the image presented to the operator) is achieved by the platform. This abstracts away the latency-sensitive parts of the robot control, making the robot's behavior stable in the presence of poorly characterized latency between the operator and the vehicle.

15 Claims, 21 Drawing Sheets

(56) References Cited

U.S. PATENT DOCUMENTS

2011/0264303 A1* 10/2011 Lenser ................ G06T 15/00
  701/2
2014/0032013 A1* 1/2014 Riley ................ G01C 23/00
  701/2

* cited by examiner

DELAYED TELOP AID

CROSS REFERENCE TO RELATED APPLICATIONS

This application claims priority from U.S. Patent Application Ser. 61/803,440, entitled "Delayed Telop Aid", filed on 19 Mar. 2012. The benefit under 35 USC §119(e) of the United States provisional application is hereby claimed, and the aforementioned application is hereby incorporated herein by reference.

SEQUENCE LISTING OR PROGRAM

Not Applicable

TECHNICAL FIELD OF THE INVENTION

This invention relates to a teleoperator's ability to control a remote controlled, unmanned vehicle In particular, the invention relates to a closed loop control of a remote controlled, unmanned vehicle ensuring that a predicted pose after the delay (and therefore the image presented to the operator) is generated and displayed by the platform.

BACKGROUND OF THE INVENTION

Most people who have teleoperated a robotic system easily recognize the challenges imposed by the reduced situational awareness, and the effects of delays and poor communications. Control of SUGVs in cluttered environments requires fine control of the platform to avoid obstacles, and align the platforms with doorways or stairways. On larger UGVs, speed is normally paramount for mission success, and communication delays can cause control instabilities that often result in overturned or damaged vehicles.

Recent developments in UGVs have led to significant increases in military spending. It is estimated that global spending on UGVs reached $418 million in 2010 [12]. As the capabilities of these UGVs are expanded past Explosive Ordnance Disposal (EOD) and into perimeter surveillance, logistics support and armed combat, the market is expected to grow to upwards of $2.9 billion by 2016. This growth will primarily be driven by military, homeland security and law enforcement sectors. In particular, the U.S, military will be a significant engine of growth due to a Congressionally Directed Goal of ⅓ of ground combat vehicles should be unmanned by 2015.

With bombs, mines and improvised explosive devices (IEDs) littering the battlefield, soldier's lives are put at extremely high risk during bomb diffusion missions. Militaries have sought many ways to reduce the exposure of personnel to such hazardous conditions. Robots offer the perfect solution. Extensive research is being done on teleoperation and ways to remotely control the aforementioned robots. For these robots to be used effectively, information from sensors, microphones and cameras must be relayed in real time or create a "virtual real time" experience. Extreme precision and complete situational awareness is needed when detecting and disarming explosives.

The ongoing battle in the Middle East has caused a spike in interest in these robotic soldiers. According to Lieutenant General Michael Oates, in 2011 "IEDs are still responsible for the greatest number of our casualties in Iraq and Afghanistan". Such danger has been reduced drastically, 37 percent, thanks in part to the militaries increased use of drones to detect IEDs. Still, however, insurgents show no sign of slowing, as the number of IEDs planted are between 1,300 and 1,500 per month, increasing the need for more EOD robots to be deployed.

Intelligence gathering has been a staple of warfare since the beginning of organized combat, and without which any army is bound to fail. Often, these missions leave soldiers exposed and vulnerable to attacks when surveying, especially behind enemy lines. Modern warfare has allowed the Inventors to utilize unmanned vehicles to carry out such missions. Replacing soldiers with unmanned vehicles not only allows for more in depth surveillance, but also saves the lives of those soldiers sent on reconnaissance missions. Further, robots can operate for hours without fatigue and loss of perception unlike humans, increasing their effectiveness at evaluating enemy positions and territory. In 2001, the military had commissioned only 120 teleoperated robots for use in the Middle Eastern. As of 2008, however, ground robots had increased to more than 6,000 in theater.

This massive spike in interest and demand for unmanned vehicles has increased the need for an improved and reliable visual processing algorithm to reduce, or even completely remove, data transmission lag between robot and operator. Control of SUGVs in cluttered environments requires fine control of the platform to avoid obstacles, and align the platforms with doorways or stairways. On larger UGVs, speed is normally paramount for mission success, and communication delays can cause control instabilities that often result in overturned or damaged vehicles. In order to improve the teleoperator's ability to control the robot, algorithms that create future synthetic images, and predict platform poses are used to create an image on the Operator Control Unit screen that smoothes out the stops/starts/jumps and irregular video feed. Currently, operators must be in the line of sight of the robot, otherwise serious data transmission lag can occur, rendering them ineffective. Additionally, this lag can cause cognitive fatigue in the operator, causing headaches and stress. These time delays can cause operations to go awry. The Darkstar UAV had a seven (7) second delay between remote command and implementation. The operators were not able to send commands to the Darkstar in time, resulting in an unpredictable crash during take-off. Such events have sparked significant demand for predictive displays to eliminate lag, cognitive fatigue, and increase remote operation distances.

DEFINITIONS

AUGV is defined as an Autonomous Unmanned Ground Vehicle.

DTA is defined as Delayed Telop Aid.

OCU is defined as Operator Control Unit.

"Platform Pose" is defined as the combined location and orientation of the platform of the robot or vehicle.

SIFT is defined as Scale Invariant Feature Transform.

SURF is defined as Speeded Up Robust Features.

LADAR (LAser Detection And Ranging) systems use light to determine the distance to an object.

UGV is defined as an Unmanned Ground Vehicle.

SUMMARY OF THE INVENTION

The proposed system, Delayed Telop Aid (DTA), improves the teleoperator's ability to control the vehicle in a three step process. First, DTA predicts robot motion given the operators commands. Second, DTA creates synthetic images to produce a video feed that looks as if the robot communication link had no delay and no reduced bandwidth. Finally, DTA performs closed loop control on the robot platform to ensure that the robot follows the operator's commands.

This final step is one of the main characteristics that sets DTA apart from other approaches, a closed loop control of the platform makes sure that the predicted pose after the delay (and therefore the image presented to the operator) is achieved by the platform. This abstracts away the latency-sensitive parts of the robot control, making the robot's behavior stable in the presence of poorly characterized latency between the operator and the vehicle.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

FIG. 10C illustrates a synthetic image where the compressed image is textured mapped to a surface that matches the curve shown in FIG. 10a;

FIG. 11B illustrates 3-D scans of an office space using the small robotic platform shown in FIG. 11a;

DESCRIPTION OF THE INVENTION

Figure 1:
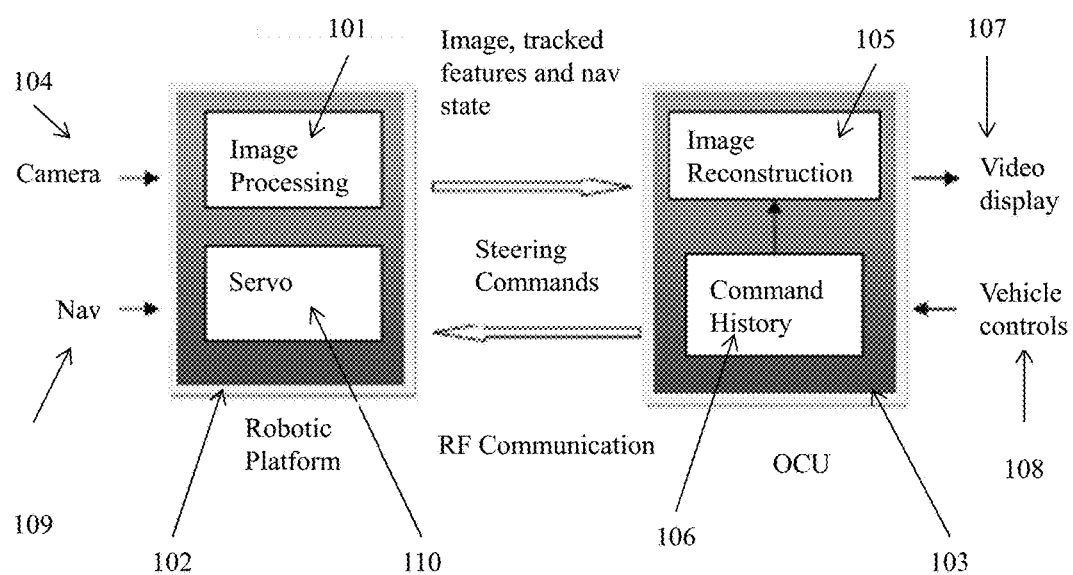
FIG. 1 shows the DTA system architecture.

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention. Referring to the figures, it is possible to see the various major elements constituting the apparatus of the present invention.

The proposed system, Delayed Telop Aid (DTA), improves the teleoperator's ability to control the vehicle in a three step process. First, DTA predicts robot motion given the operators commands. Second, DTA creates synthetic images to produce a video feed that looks as if the robot communication link had no delay and no reduced bandwidth. Finally, DTA performs closed loop control on the robot platform to ensure that the robot follows the operator's commands.

This final step is one of the main characteristics that sets DTA apart from other approaches, a closed loop control of the platform makes sure that the predicted pose after the delay (and therefore the image presented to the operator) is achieved by the platform. This abstracts away the latency-sensitive parts of the robot control, making the robot's behavior stable in the presence of poorly characterized latency between the operator and the vehicle. The work to perform these tasks is split between two sets of computing hardware, one at the platform and the second at the Operator Control Unit (OCU). At the platform the inventors have access to full resolution video at small predictable latency, but in general the inventors lack the number-crunching capabilities to perform computationally expensive image reconstruction tasks. Also, at the time video is collected, the communication delays can only be estimated. On the other hand, at the OCU the inventors could easily house the computational needed for image processing, but by the time video arrives at the OCU it has been heavily processed to improve throughput, and contains compression artifacts that make image processing impractical.

The premise behind the inventors' Delayed Telop Aid (DTA) is that the present invention can extract sufficient information about the structure of the scene using image flow and other sensor specific techniques to reconstruct a useful predicted view of the world at a future point in time. This reconstruction can be used as a teleoperation aid. The desired result is to make it appear that the communication delay between the OCU and the robotic platform does not exist. This eliminates the biggest barrier to stable teleoperation, creating the illusion that the operator is directly controlling the vehicle without the significant video and control delays. The feedback the operator receives from the video display would respond immediately to his actions, would not be subject to communications delays, and would accurately reflect the behavior of the robot in the world.

The inventors developed various image reconstruction techniques to create the predicted synthetic video frames by using the delayed video frame along with the associated vehicle status at that point in time and the new commands queued up at the OCU. The inventors were able to demonstrate the first techniques on a live system utilizing a TALON robot. The present invention's technique makes two important assumptions which, if perfectly met, eliminate the perceived delay:

1) The inventors can create a 3D model of the environment. This is needed to be able to synthesize the image from the predicted pose.

2) The inventors can accurately control the vehicle to the predicted pose.

If both of these assumptions are satisfied, the operator should have the appearance of no delay, and the control will not be affected. It is clear that both assumptions have their issues. The inventors have been able to control the vehicle with sufficient accuracy. Therefore, the main goal of the research was to evaluate techniques that could be used to create the synthetic images from the 3D models. For this purpose, the inventors developed optical flow techniques such as SURF feature detection and tracking, as well as the Lucas-Kanade method. Using platform navigation data for feature tracking improved the results. The inventors also combined SURF feature tracking with Delaunay mesh generation, thin plate spline interpolation and curve fitting for synthetic image reconstruction. The data the inventors collected using a TALON platform allowed them to quickly evaluate different algorithms by playing back collected data through the system.

Delaunay mesh generation and thin plate spline interpolation showed promising results in creating these synthetic images. In addition to the above techniques, the inventors also integrated a simple OpenGL based image reconstruction algorithm with our TALON platform. As part of this live integration and testing exercise with the TALON, the inventors developed a new command interface to the TALON based on distance and yaw commands that would help guarantee that the platform follows the delayed commands from the OCU accurately. This, in turn, helps in creating accurate synthetic future images for the operator.

Now referring to FIG. 1, the DTA Phase system 100 divides the required image processing 101 between the vehicle 102 and the OCU 103, taking into consideration the video quality and computational assets available. Images are taken by a camera 104 and processed 101 on the robotic platform 102 along with navigational information 109 are sent to the OCU 103 for reconstruction 105 via RF communication with input from the command history 106. Reconstructed images are sent to a video display 107. An operator looking at the video display, can submit vehicle controls 108 with steering commands to a servo 110 located on the platform 102 by RF communication. Vehicle controls 108 are also stored in the command history 106 as the controls occur and are used in reconstructing images 105.

The overall objective is to design a teleoperation aid that can be used during high latency teleoperation scenarios. The main goal of the research was to evaluate different techniques that could be used to create predicted synthetic video frames using predicted navigation states of the platform, thereby giving the operator more confidence, control, and better situational awareness when teleoperating a robotic platform using high latency communication links. The main tasks accomplished are listed below:

The Inventor's developed the overall control paradigm, including messaging between OCU and robot as well as time tagging strategies. The Inventor's collected time tagged indoor and outdoor video and navigation data using our development platform at company facilities. This allowed the Inventors to experiment with different algorithms using the same datasets thereby making the evaluation and comparison of different algorithms easier.

The Inventor's evaluated different feature detection algorithms such as SIFT, SURF, and Harris corner detectors. To improve feature tracking the inventors augmented our algorithms to use platform navigation data and triangulated the feature locations, thereby increasing the accuracy of our estimated 3D feature locations. In addition to using navigation data, the inventors also applied Kalman filtering techniques to further refine our estimate of feature locations in 3D space.

The Inventor's explored methods for generating predicted synthetic images. Once the features were identified and tracked from one frame to the next, the next step was to use these tracked features to create future synthetic video frames. Various image reconstruction techniques such as Delaunay mesh generation, thin plate spline interpolation, and curve fitting were explored. A simple OpenGL based simulated display was also explored and integrated with our OCU and a real The Inventor's integrated a simple OpenGL based display solution with a real platform. The inventors read queued commands from the joystick to simulate platform movement in the OCU using OpenGL. The inventors also developed a new command interface on our platform to accept odometer and yaw commands instead of velocity and yaw-rate commands. This was done to close the loop by making sure the platform followed the commands precisely thereby increasing the accuracy of the feedback shown to the operator.

Figure 2A:
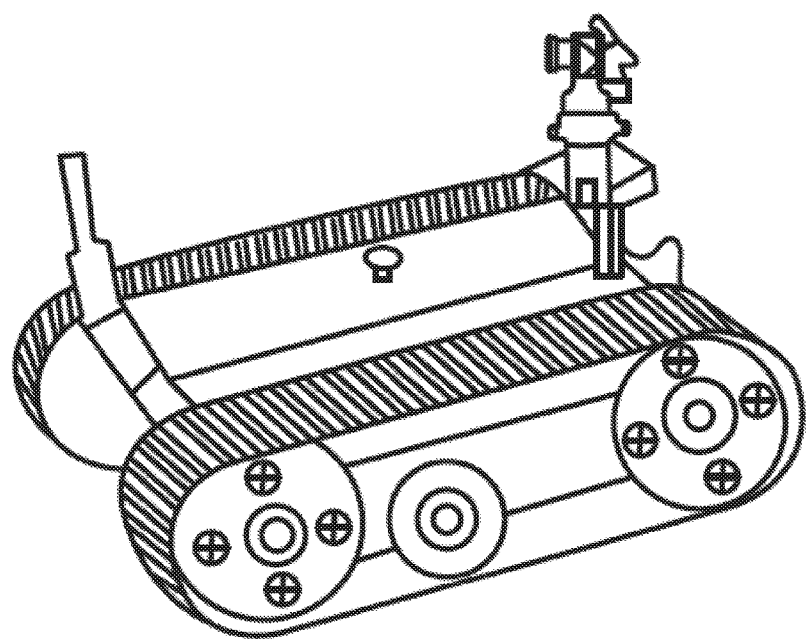
FIGS. 2A-C illustrates a live teleoperation exercise using DTA.
Figure 2B:
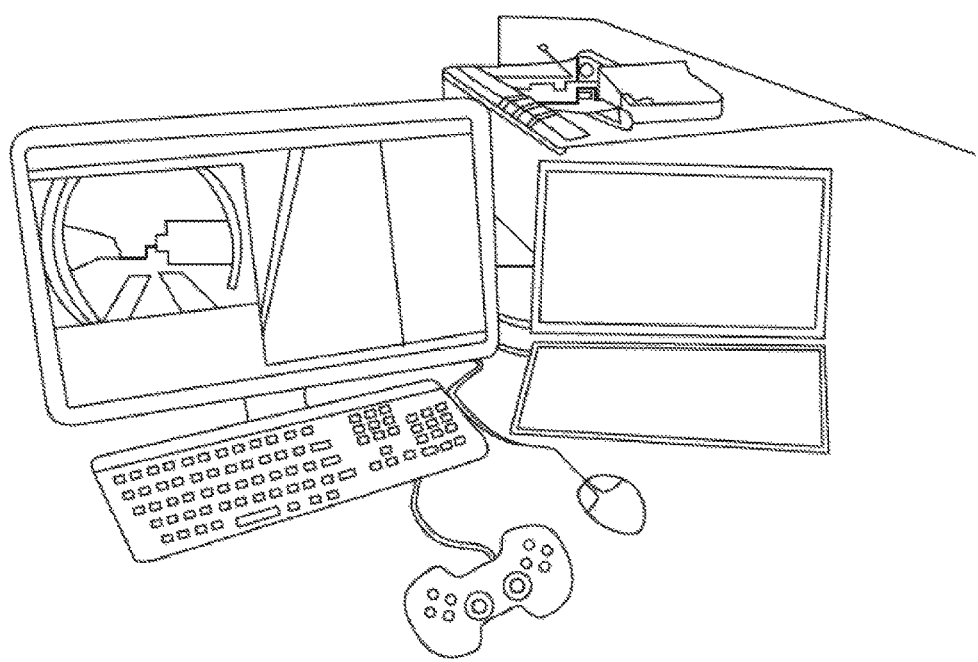
Figure 2C:
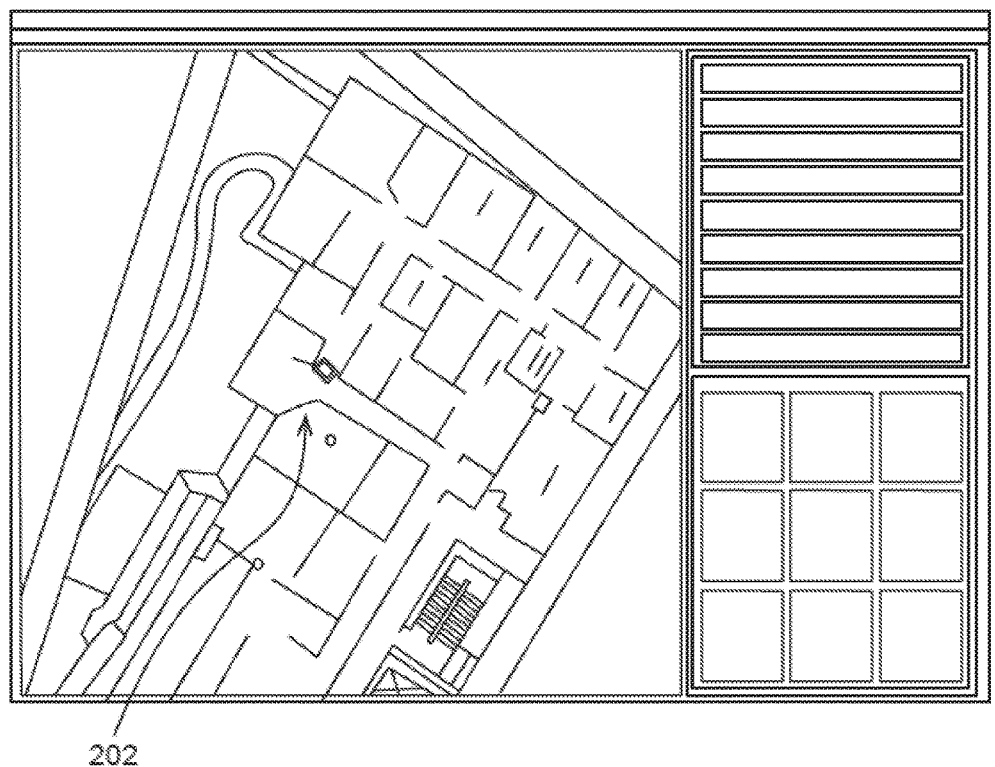

Now referring to FIGS. 2a, 2b, and 2c, a live teleoperation exercise using DTA with a TALON near the door. The operator in FIG. 2b is using/holding the DTA widget 201 in the OCU to align the TALON to the door as show in FIG. 2a. FIG. 2c illustrates the OCU with platform icon 202 and local obstacle map 203.

For the video data, the present invention collects raw Bayer images (1260×980) with GMT timestamps at 5 Hz. For the navigation data, the present invention collects the (x, y, z) location and (r, p, y) orientation of the platform along with GMT timestamps. The navigation data was collected at 50 Hz. The camera location and orientation was obtained by applying the appropriate coordinate transform to the platform location. The combined location and orientation of the platform will be referred to as "platform pose".

Figure 3:
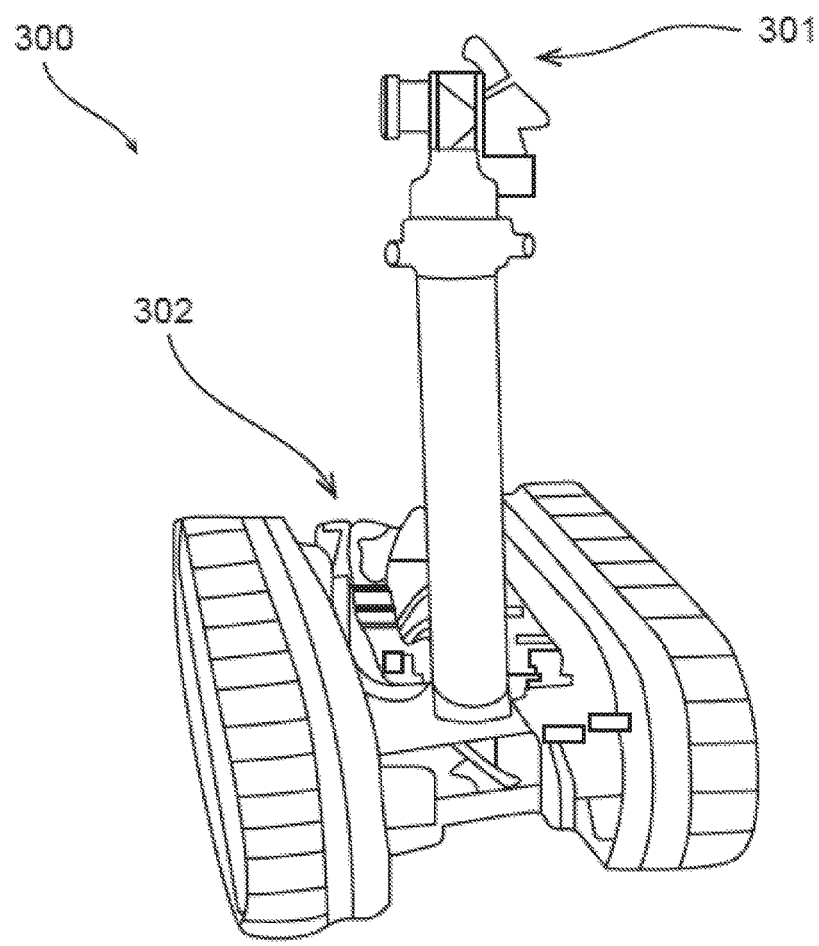
FIG. 3 illustrates a SUGV test platform.

FIG. 3 is a representation of the TALON test platform 300. The TALON test platform has a Point Grey Chameleon camera 301 mounted along with an inertial measurement unit (IMU) 302.

The inventors experimented with different algorithms to extract features from raw images such as Scale Invariant Feature Transform (SIFT), Speeded Up Robust Features (SURF) and Harris corner detectors. The inventors decided on using SURF because SURF provides scale- and rotation-invariant interest point detectors and descriptors while requiring less computation that SIFT.

The standard version of SURF algorithm is several times faster than Scale-invariant feature transform (SIFT) and claimed by SURF's authors to be more robust against different image transformations than SIFT. SURF is based on sums of approximated 2D Haar wavelet responses and makes an efficient use of integral images. As basic image features the SURF algorithm uses a Haar wavelet approximation of the determinant of Hessian blob detector The present invention's Tracking algorithm does the following: Extracts SURF features for every frame; Projects SURF features from the image into the world frame using navigation data and our fish-eye camera model; Performs ray intersection checks in 3D for the ray originating at the camera location and going through the feature location in world frame. Each feature in the last frame is compared with every feature in the current frame; If the rays are close enough, a 3D location for that feature is computed. (Condition 1). In addition to ray intersection checks, the algorithm also compares the similarity of the SURF descriptors of the two features in question to increase the tracking accuracy. (Condition 2). If both conditions are satisfied, the track is considered good and added as a node to be used during the image reconstruction phase.

Figure 4:
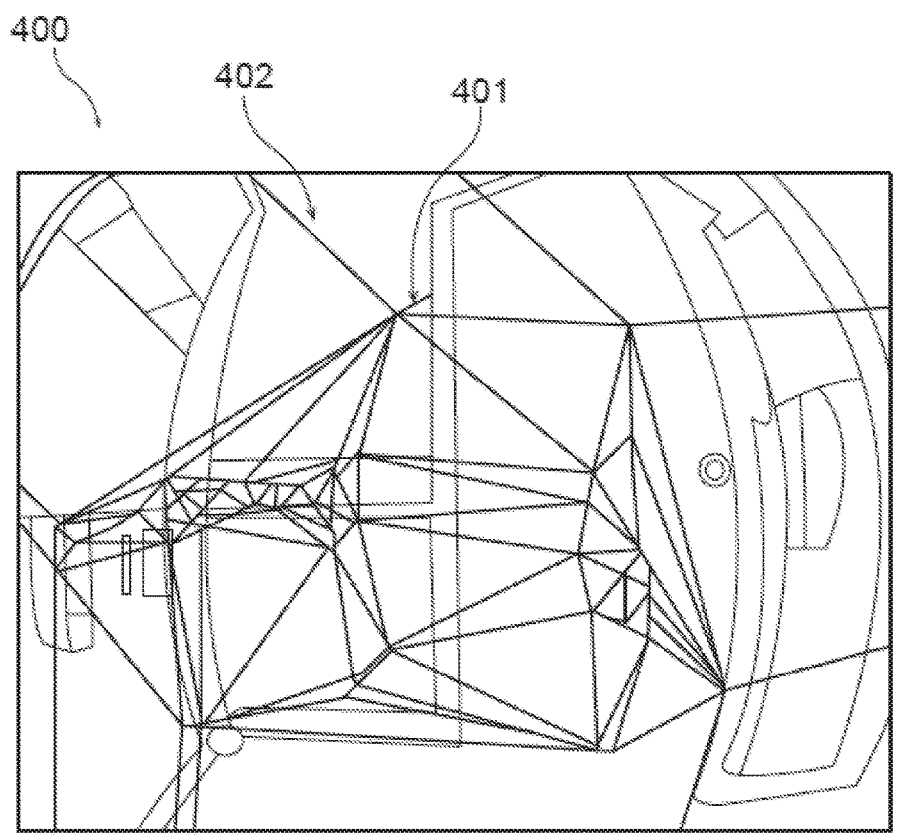
FIG. 4 illustrates SURF feature tracking between consecutive images.

FIG. 4 illustrates SURF feature tracking between consecutive images. The solid/red lines 401 show the movement of the features from one image to the next. The broken/green lines 402 are part of the Delaunay mesh with tracked features being the nodes in the mesh.

Figure 5:
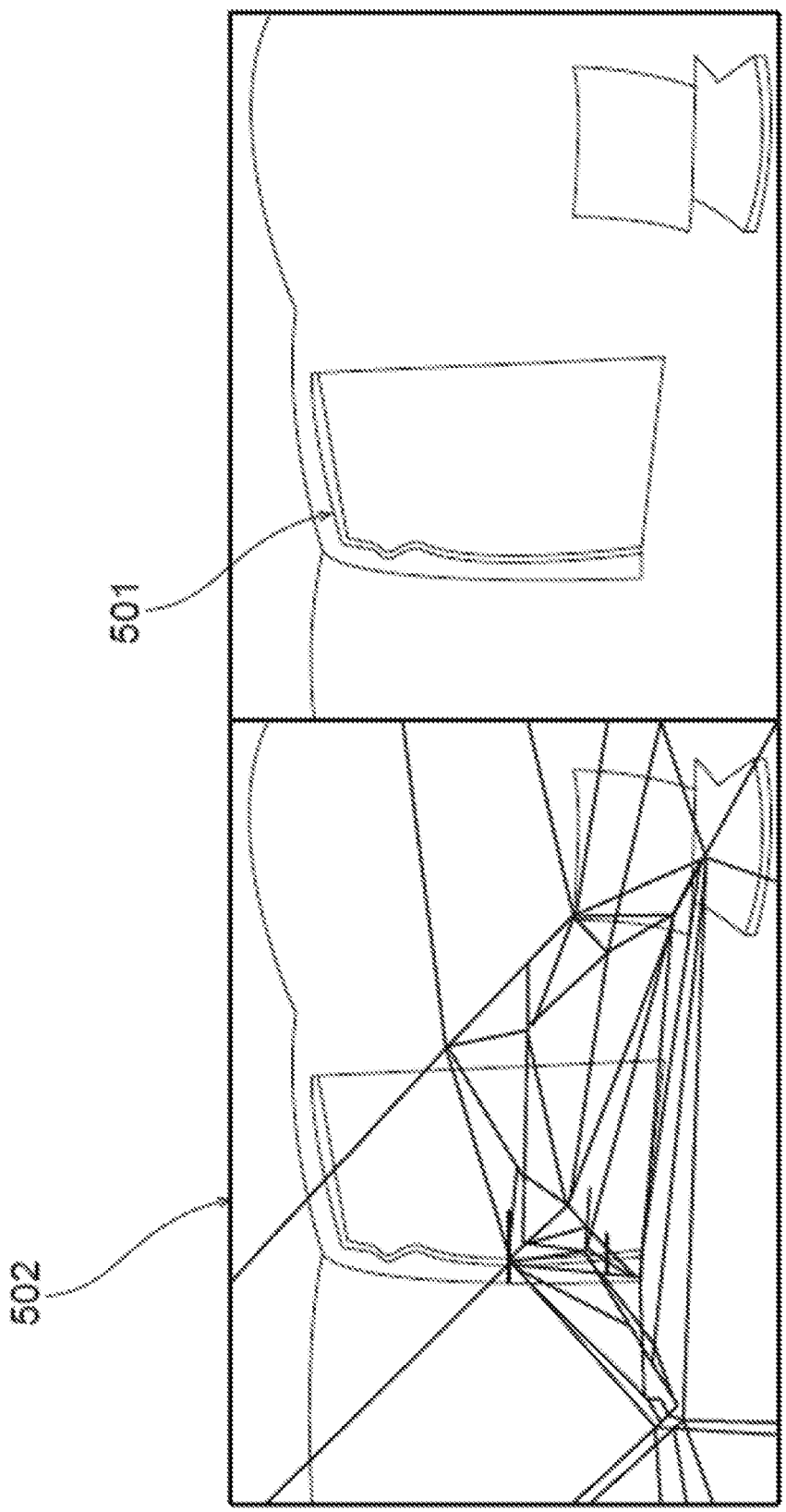
FIG. 5 illustrates tracking and prediction using navigation data.
Figure 6:
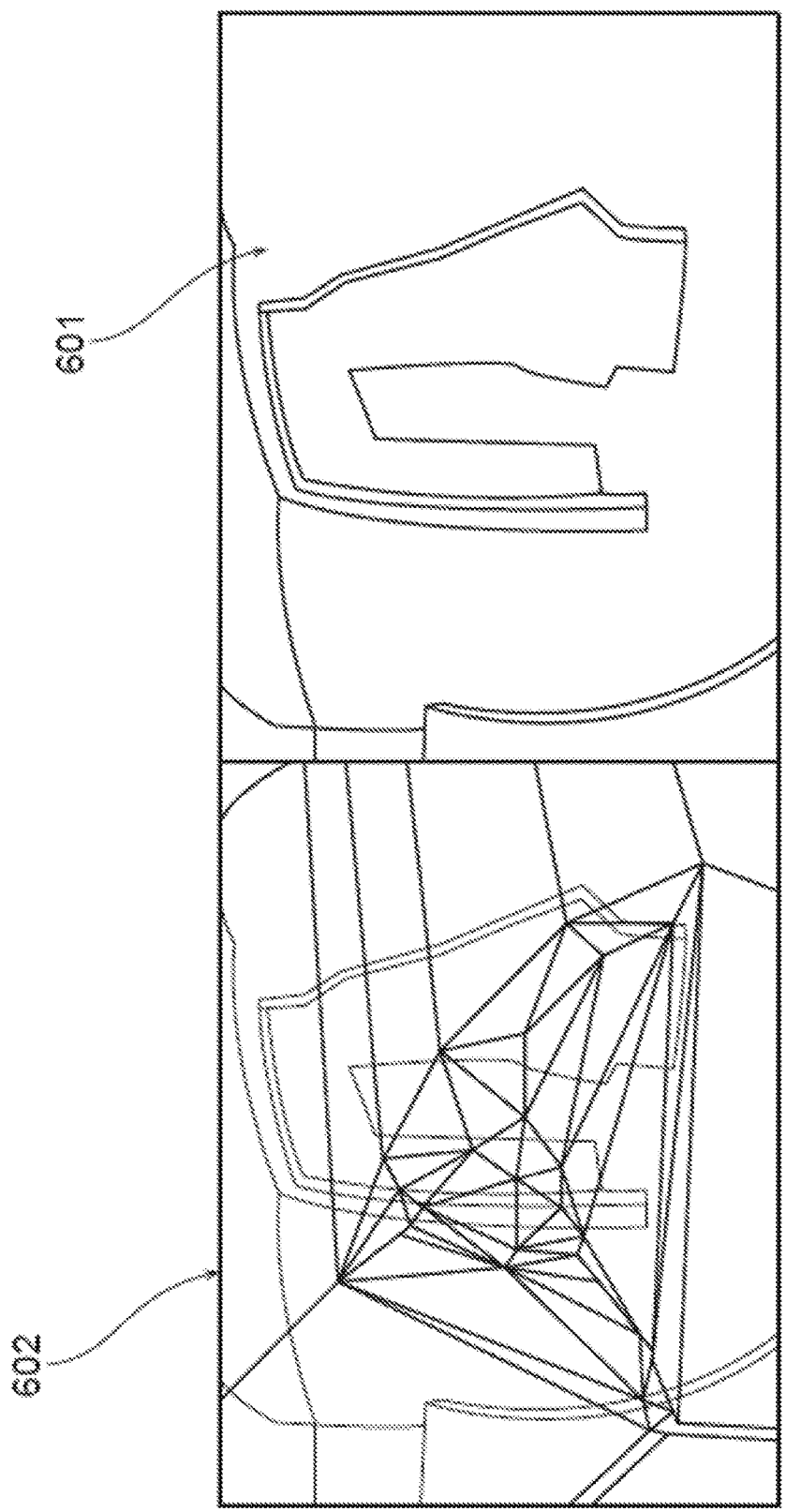
FIG. 6 illustrates tracking and prediction without using navigation data.

In order to increase the accuracy of the tracking algorithm, the present invention is augmented take advantage of the navigation data associated with each frame. The navigation data allows the algorithm to check for mismatched SURF descriptors, and only allows pixels with reasonable shifts in the image to pass through. In the absence of this check, two very similar SURF features at the opposite ends of the image could pass the filter and cause major distortions in the synthetic image created during the image reconstruction phase. FIG. 5 and FIG. 6 below show the results. The image on the right hand side 501 in FIG. 5 looks much better than the image 601 in FIG. 6. This is because the estimated 3D location of the tracked feature is more accurate when using navigation data which is evidenced by comparing the data trails of the left hand side 501 of FIG. 5 illustrating image feature movement/trails compared to the left hand side 602 of FIG. 6 which illustrates both the illustrating image feature movement/trails and navigation data.

Another improvement the inventors made to the tracking algorithm was to use a Kalman filter for each feature being tracked to improve our estimate of its 3D location using its past history. The Kalman filter is initialized with a best estimate of the 3D location of the feature using the method described above. At each iteration the filter is updated using the (x, y) location of the tracked pixel in the current image. Internally, the filter keeps track of the 3D state (x, y, z) of the feature and updates the filter based on recorded measurements.

Delayed Telop Aid (DTA) 8 estimate of the 3D location of the feature using the method described above. At each iteration the filter is updated using the (x, y) location of the tracked pixel in the current image. Internally, the filter keeps track of the 3D state (x, y, z) of the feature and updates the filter based on recorded measurements.

The 3D locations of the tracked features can be sent to the OCU along with the compressed image and the associated navigation state information of the platform. Here the 3D locations of the tracked features are used to create a synthetic image using various image reconstruction techniques.

There will be regions of the image where there are no discernable features to track. In these regions it will not be possible to compute an optical flow vector. The inventors deal with this by interpolating to the surrounding flow vectors. The present invention does this by generating a triangular Delaunay mesh connecting the image features with known optical flow vectors. The regions between are mapped onto triangular regions. This surface, with the decompressed image from the platform texture mapped to the image, will then be deformed to produce the reconstructed image for the operator to drive by. The predicted future locations of the tracked features are used to deform the Delaunay mesh.

Figure 7:
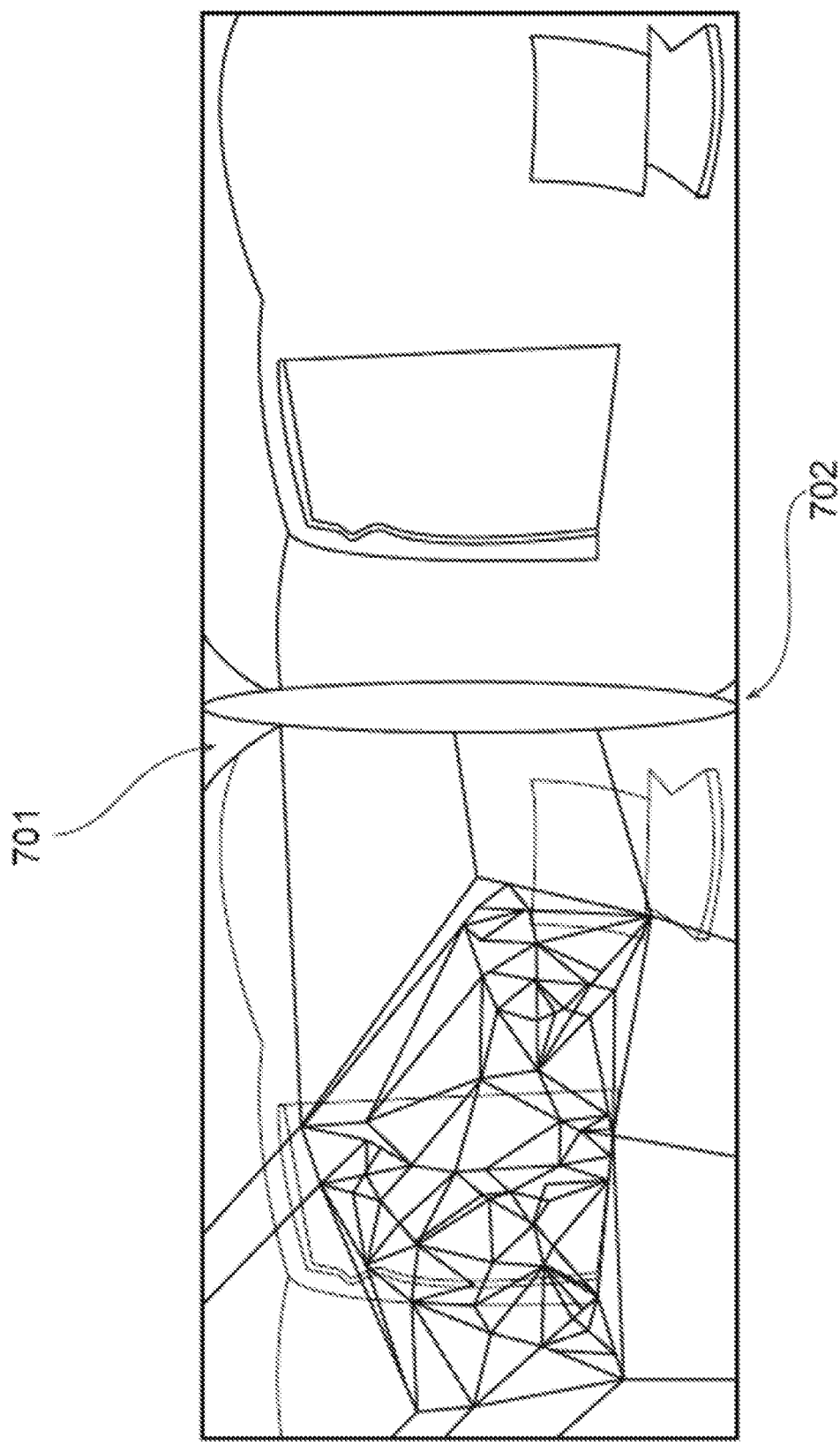
FIG. 7 shown an original image with tracks in red and predicted feature locations in blue and a reconstructed warped image using a Delaunay mesh using predicted feature locations.

As the operator steers, additional commands go into the history queue and to the vehicle itself. To simulate these joystick commands when working with recorded data, the present invention reads future navigation data from previously collected datasets. This produces a new future vehicle position estimate, and a new view position estimate for each feature in the current image. The image is treated as a flexible sheet or flexible two-dimensional plane with the locations of the tracked image features as the control points, which are inflexible. When the image features are repositioned in the field of view based on the vehicle motion prediction, the portions of the image not directly associated with image features are interpolated based on the new positions of the points in the triangular mesh. Using OpenGL, the inventors texture map the compressed image onto this warped surface. These images are then displayed on the screen. The black area 701 in the red circle 702 in the left image indicates that the platform will be turning to the left based on joystick commands from the operator as shown in FIG. 7.

Also notice the deformations on the door frame, which reflect the limitations of using the Delauney mesh model. Next a comparison of a synthetic image (1 second into the future) that was created using the following data as inputs: SURF features tracked between frames taken at 5 Hz (0.2 s apart) and Platform pose 1 sec into the future from the time the current frame that is being used to create the synthetic image was taken (read from our collected dataset).

Figure 8:
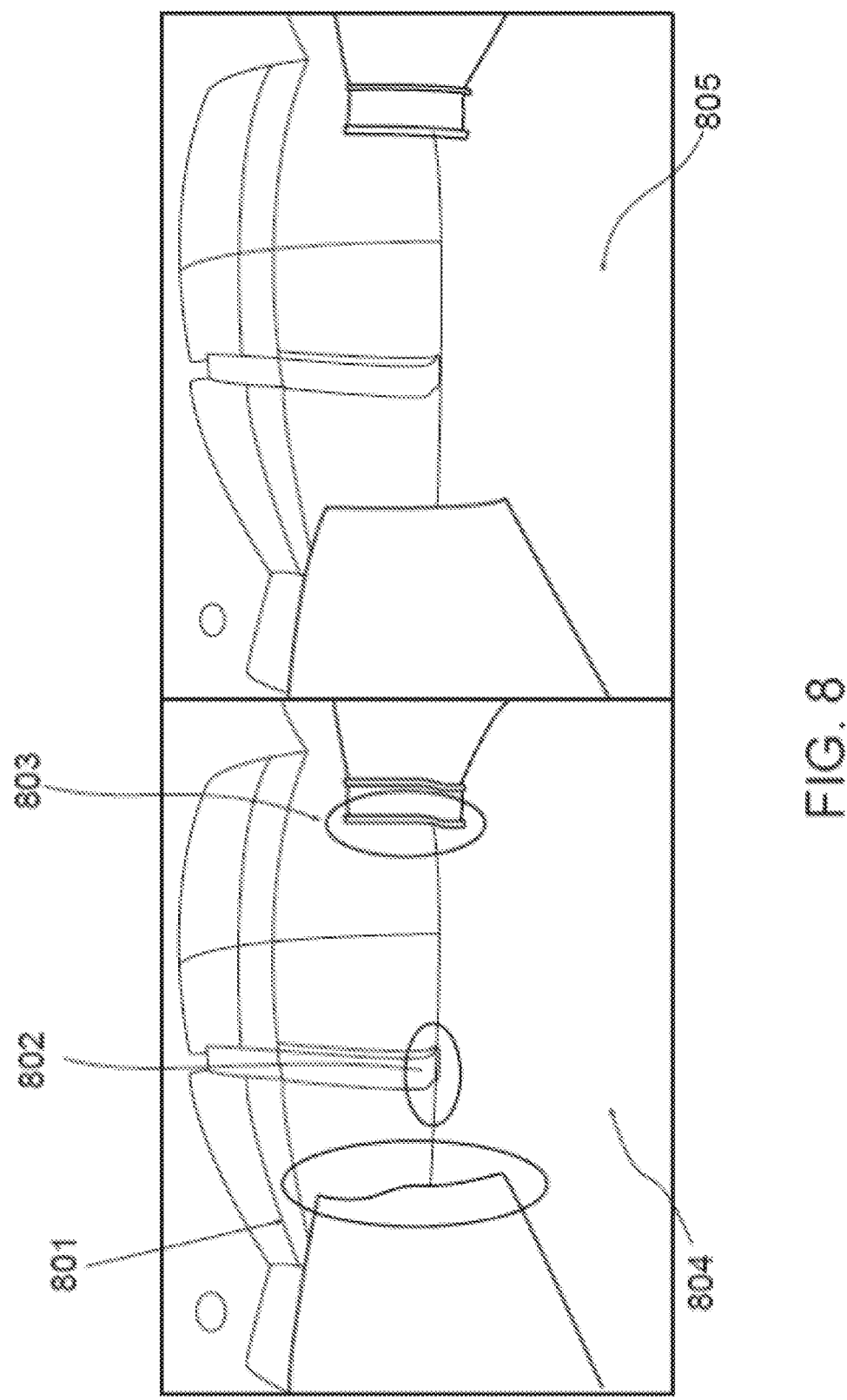
FIG. 8 illustrates a synthetic image at predicted time T+1 (Right) and a real image taken at time T+1.

The present invention shows the future synthetic image 804 along with the real frame 805 at the corresponding time side-by-side for your evaluation below. Deformities introduced by the image reconstruction algorithm are highlighted in the three circles 801-803 of FIG. 8. The synthetic image 804 was created using the Delaunay mesh algorithm as shown in FIG. 8. As can be seen, the synthetic image looks very real.

Thin-plate splines were introduced to geometric design by Duchon. The name thin-plate spline (TPS) refers to a physical analogy involving the bending of a thin sheet of metal. In the physical setting, the deflection is in the z direction, orthogonal to the plane. In order to apply this idea to the problem of coordinate transformation, one interprets the lifting of the plate as a displacement of the x or y coordinates within the plane. According to Bookstein, TPS has an elegant algebra expressing the dependence of the physical bending energy of a thin metal plate on point constraints. For interpolation of a surface over a fixed set of nodes in the plane, the bending energy is a quadratic form in the heights assigned to the surface. TPS is a non-linear warp transform defined by a set of source and target feature locations. A point on the mesh close to the source feature will be moved to a place close to the corresponding target feature location. The points in between are interpolated smoothly using Bookstein's thinplate spline algorithm.

In order to perform thin plate spline interpolation, the inventors generate two lists consisting of the pixel locations of the tracked features in the current image and the predicted future 2D pixel locations of the tracked features. The predicted future pixel locations of the tracked features are computed by projecting the 3D feature location back into the synthetic 2D image using the world-to-image transformation provided by the camera model using the predicted navigation state of the platform.

Using the two lists above, the coefficients of an interpolated cubic function are computed. Once the parameters are estimated, new (x, y) locations of all the pixels in the synthetic future image are computed. This image is then texture mapped to a surface in OpenGL and displayed to the operator. The bending of the thin plate can be controlled using a Rigidity parameter.

Figure 9A:
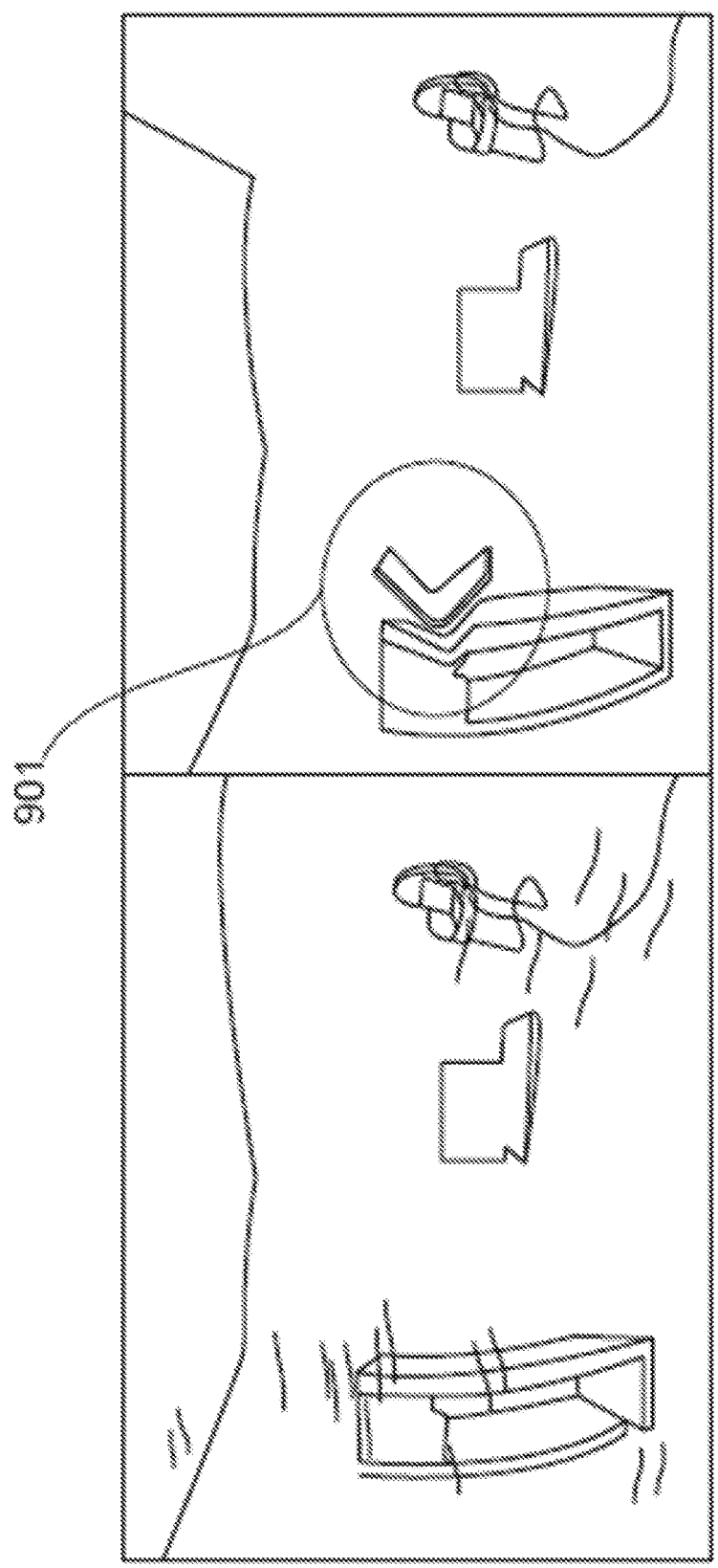
FIG. 9A illustrates Delaunay Mesh Generation vs. Thin plate Spline Interpolation.
Figure 9B:
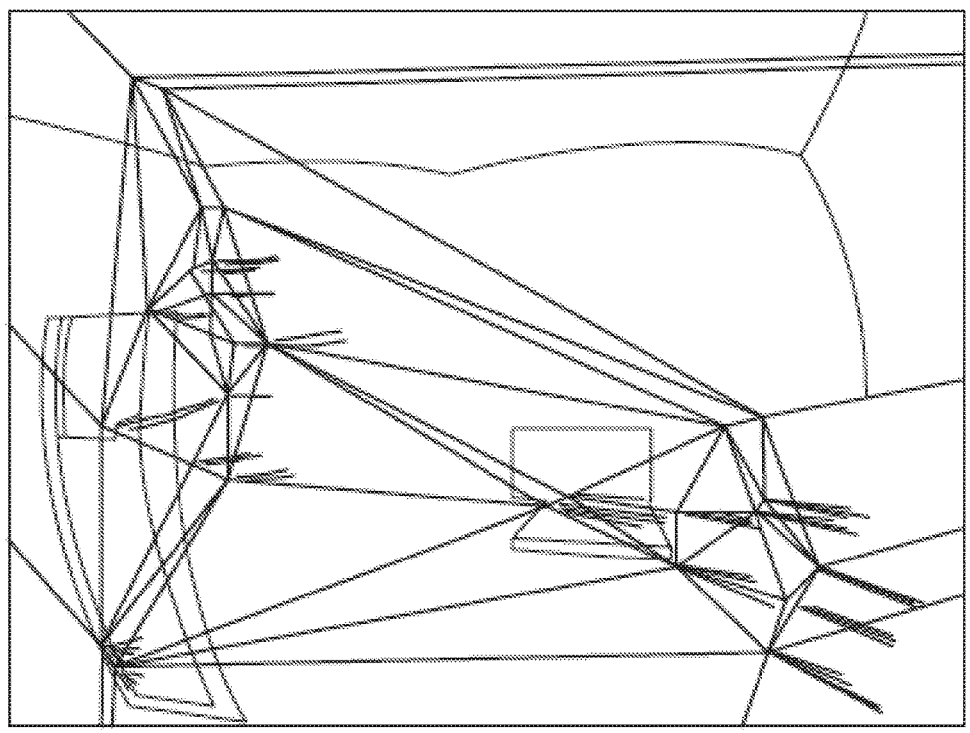
FIG. 9B illustrates the Delaunay Mesh Generation.
Figure 9C:
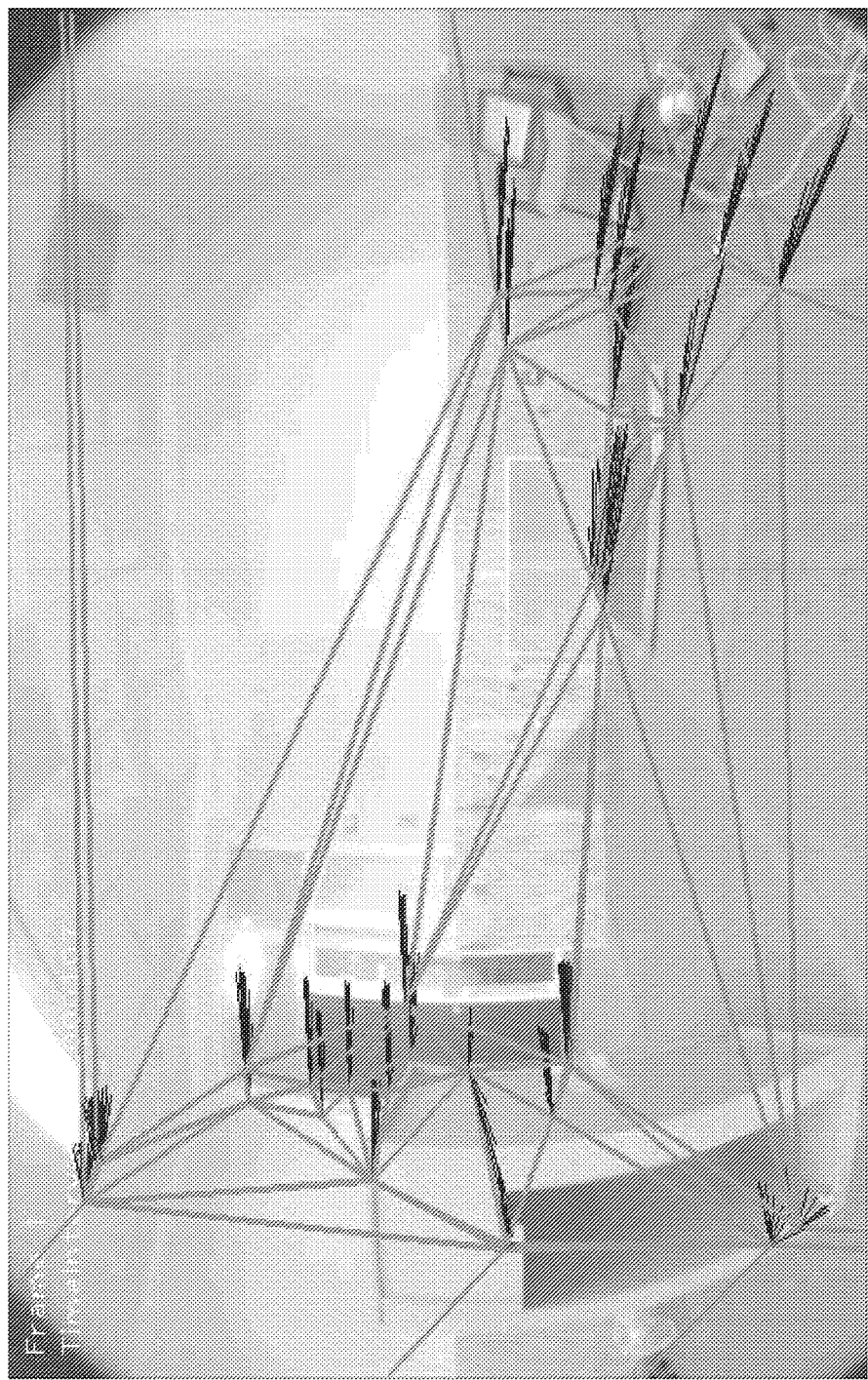
FIG. 9C illustrates the original image with tracked SURF features.

The thin plate spline algorithm improved the quality of the synthetic images created using tracked SURF features. The thin plate spline algorithm helped in reducing distortions caused by the triangles formed by features at different depths in the image when using Delayed Telop Aid (DTA) and the Delaunay mesh, as highlighted by the red circle 901 in FIG. 9a. One of the drawbacks of the thin plate spline algorithm is that the thin plate spline algorithm doesn't work well if there are very few features in an image.

Figure 10A:
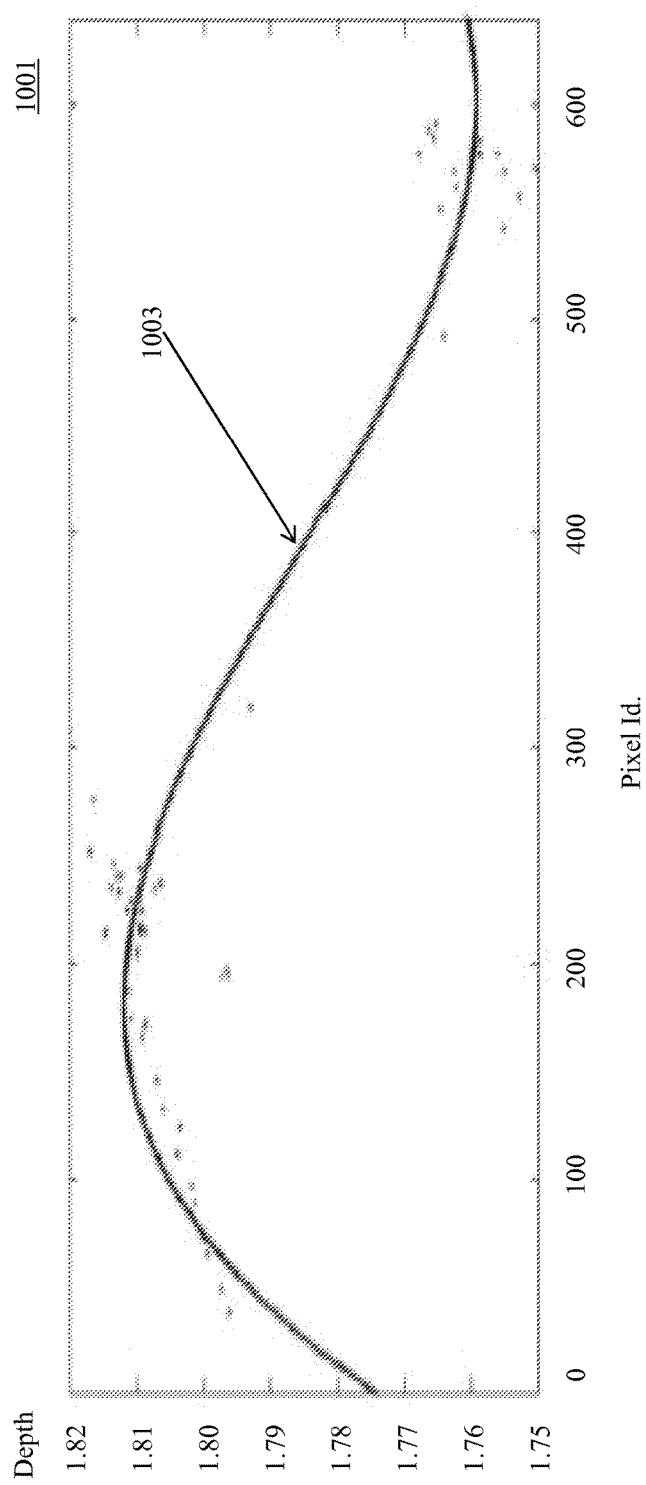
FIG. 10A illustrates an attempt to fit a quadratic equation function to the depth values of tracked features in an effort to draw the surface in OpenGL using the depths derived from this fitted function rather than drawing a flat wall at an arbitrary depth as used in a more simple OpenGL based approach.
Figure 10C:
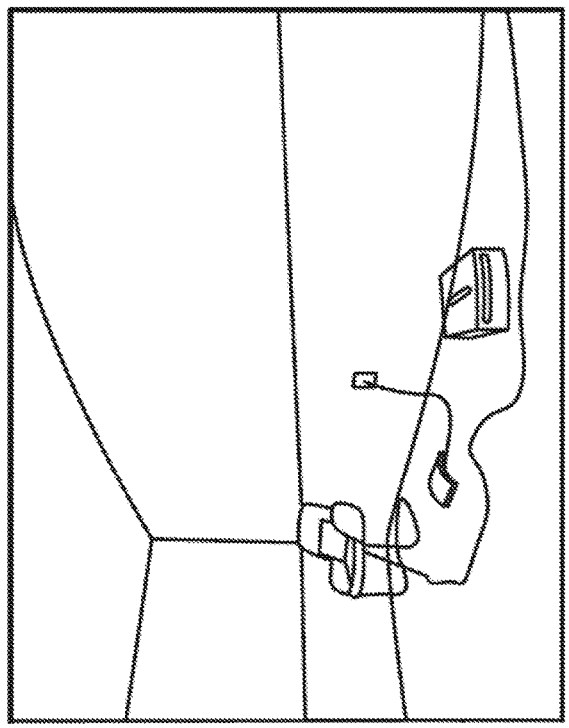
Figure 10B:
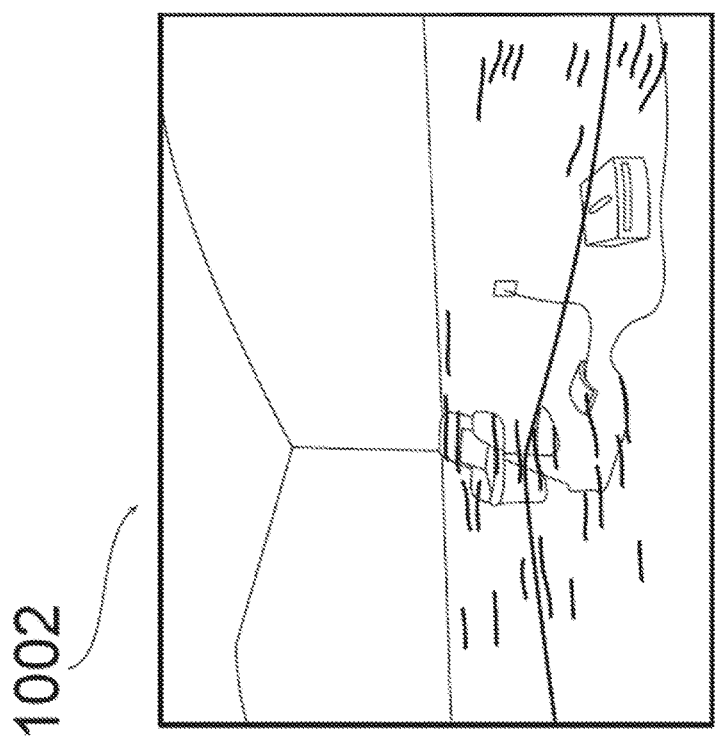
FIG. 10B illustrates and example of reconstruction using curve fitting where the original image is shown with tracked features.

The inventors also tried fitting a quadratic function to the depth values of the tracked features as shown in FIG. 10a 1001. The idea was to draw the surface in OpenGL using the depths derived from this fitted function rather than drawing a flat wall at an arbitrary depth as in our simple OpenGL based approach. The results were mixed since the fitted functions didn't represent correct depths for all surfaces in the image. The images shown in FIG. 10b show some results using this approach. The x-axis on all the graphs below represent the pixels in the image (ranging from 0 to 639) and the depths are drawn on the y-axis. The compressed image 1002 is textured mapped to a surface that matches the curve 1003 as shown in FIGS. 10a-b.

In order to test the entire system in a closed loop setup, the inventors integrated our image reconstruction modules with the OCU and our TALON platform. The inventors performed the following tasks as part of this integration exercise.

A new command interface to control the TALON was developed. Normally track velocities are sent from the joystick to the TALON in order to teleoperate the command interface. Commanding the platform this way has some drawbacks. It is hard to predict the future location of the platform when using a velocity based command interface as velocity based servoing is more error prone. A better way to command with a robot is to send the robot desired odometer and yaw commands from the joystick. This allows the Inventors to better predict the future location of the platform using the new commands thereby improving the accuracy of the synthetic future images shown to the operator. This gives more confidence to the operator in terms of what the platform is actually doing and seeing.

New code was added to create odometer and yaw commands in the pendant process that interfaces with the joystick and send odometer and yaw commands to the platform. Code was added on the platform to read odometer and yaw commands and create odometer and yaw driving commands for the platform to follow.

The inventors also implemented a new process that runs on the platform that associates the video frames taken each cycle with the corresponding vehicle pose at the time the frame was captured. The frame ID of the associated camera frame is stored with the corresponding vehicle status message and sent back to the OCU.

On the OCU side, the video frames taken each cycle associated with the corresponding vehicle pose at the time the frame was captured are used to correct the estimate of where the platform actually is based on when and where the camera frame was captured. This correction in our predicted platform pose is then applied to adjust the synthetic predicted frame currently being displayed to the operator.

As mentioned earlier, the inventors integrated a simple OpenGL based image reconstruction module in the OCU. The OCU takes the last video frame received from the platform and texture maps the last video frame on a flat surface. The inventors then use the predicted pose of the platform (computed using the commands sent to the platform from the OCU) to change the way the inventors look at this flat surface model. The inventors use orthographic projection for this purpose.

OpenGL takes care of the rest and the inventors display this synthetic image to the operator. The zoom in/zoom out effect is achieved by changing the view port in OpenGL.

The odometer and yaw commands sent to the platform using the joystick are queued up in the OCU along with a timestamp. The image reconstruction module has direct access to this queue of commands and uses the commands right away to provide instant feedback to the operator by creating predicted synthetic frames based on those commands and the last video frame/vehicle status received from the platform. The video frames and vehicle status messages received from the platform are also queued up in the OCU. In order to simulate latency, the camera frames are sent to the image reconstruction module after a predefined time interval has passed (from the time camera frames are taken). This delay threshold is configurable to simulate different latencies. When the image reconstruction module receives a new frame, the inventors find the corresponding vehicle status message by matching the frame id stored in the vehicle status message. Let's say the delay was set to one second. The vehicle status received from one second ago is now used to correct our current estimated platform pose. This correction in pose is used when the inventors generate the next synthetic image for the operator.

Live delayed compressed video from the SUGV Predicted synthetic video Track reference lines are drawn to help the operator Timestamped Odometer/Yaw commands, Timestamped Odometer/Yaw commands, and Timestamped JPEG video frames/Vehicle Status.

The present invention can be made into a "kit" of hardware and software components that supports various sensors and different modes of operation. This kit is a software product for potential customers.

Basic Teleoperation mode: This is the base system that includes the Sensor Data Capture and Processing Library and the Vehicle Control Library runs on the platform and the Image Reconstruction Library and the Vehicle Command Library that can be integrated with any OCU. The kit includes an OCU integrated with DTA out of the box. The Sensor Data Capture and Processing Library provides support for common-off the-shelf sensors. The Image Reconstruction Library includes all the algorithms for creating synthetic images to help improve the operator's capability to teleoperate the vehicle by eliminating the effects of latencies in both directions.

Teleoperation mode with Reactive Obstacle Avoidance: This package provides the platform the ability to detect obstacles and stop in the case where blindly following commands from the operator results in a collision with an obstacle that is sensed by the platform. This functionality provided by the World Modeling and Path Planning and Obstacle Avoidance libraries provided in this kit. The user will not be able to use the path planning features in the library in this mode.

Teleoperation mode with Path Planning and Obstacle Avoidance: When running in this mode, the platform detects and avoids obstacles detected by the platform. The platform It corrects for erroneous commands sent from the OCU due to over steering. The platform uses the operator commands as reference for path following but also evaluates other paths and provide feedback to the operator.

The present invention also has a sensor system designed and implemented on a military-relevant small robotic platform as shown in FIG. 12a. The inventors propose to provide this 360 degree video and 360 degree LADAR imaging and required computing and communications hardware as optional components of the Teleoperation Kit. The potential customer can choose to buy this hardware or integrate our software libraries with their hardware. The hardware components of the kit can be chosen based on customer requirements.

Figure 11A:
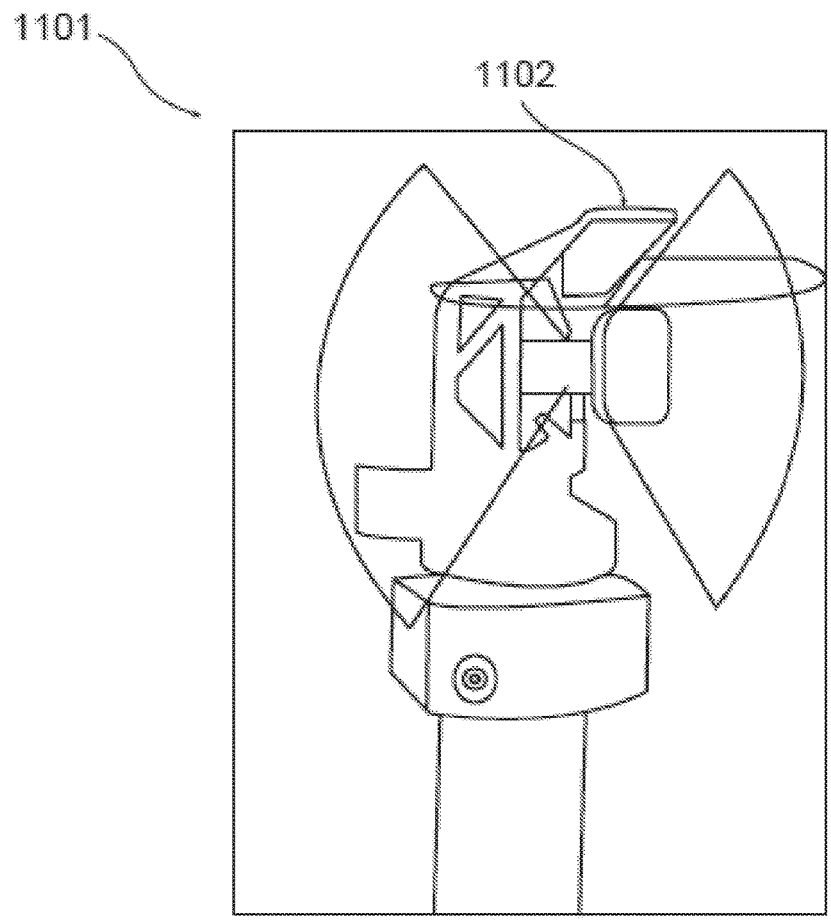
FIG. 11A illustrates a sensor system designed and implemented on a military-relevant small robotic platform.
Figure 11B:
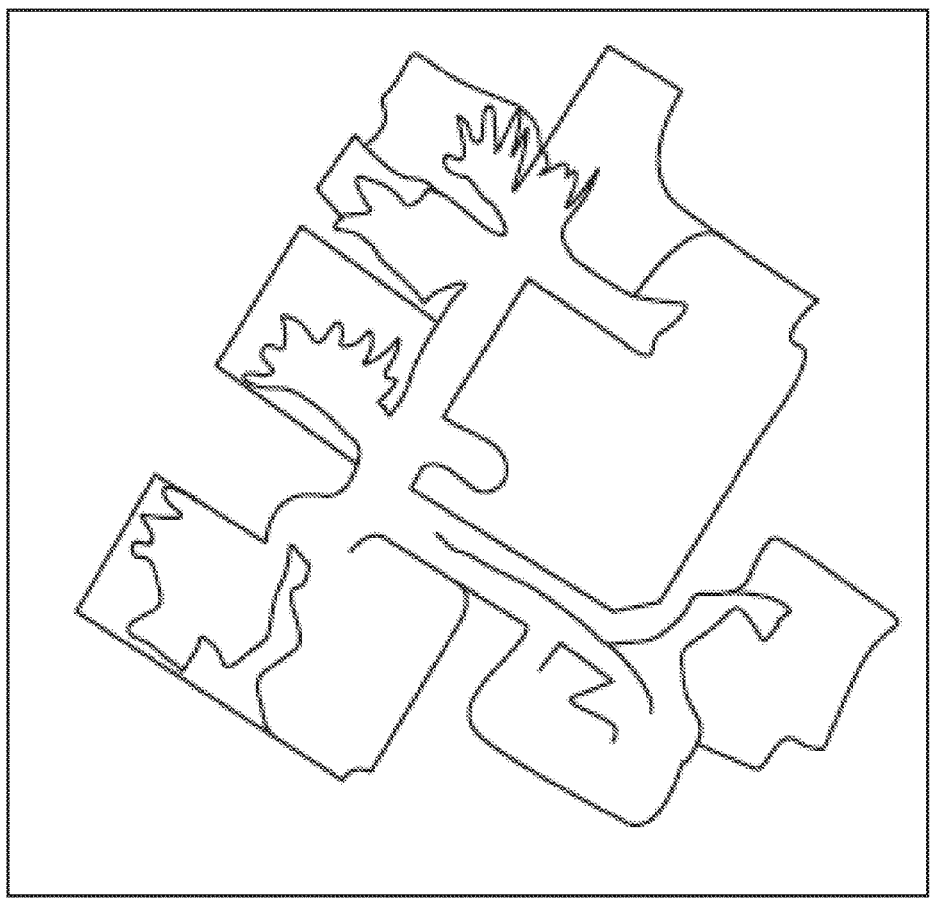

The RASRBot sensor head 1101 illustrated in FIG. 12a includes 360 degree video and LADAR. Three fisheye cameras are fused together to form a 360×100 degree image around the robot. The LADAR is a 270 degree single line scanner. A mirror 1102 reflects the normally vertical looking 90 deg to a horizontal scan. A controllable pan motor rotates the LADAR providing vertical scans for terrain slope detection and a horizontal scan for thin obstacle detection and registration. In FIG. 11b, 3D scans of an office space are shown.

The inventors continue the development and tailoring of various image reconstruction approaches to create better synthetic images that portray the current state of the environment as seen by the platform. Through testing and research, the inventors have continually added functionality to the platform to control the vehicle based on odometer and yaw commands as development has progressed. Based on live testing results on the TALON, the inventors were satisfied with command following capability of the platform. The platform followed the commands very accurately, making the prediction part easier. Given those results, the highest priority steps are improving synthetic image generation, fast accurate world modeling and supporting varying levels of autonomy.

The Image Reconstruction Module that runs as part of the Operator Control Unit (OCU) will be completely independent of the sensors on the platform.

Figure 12:
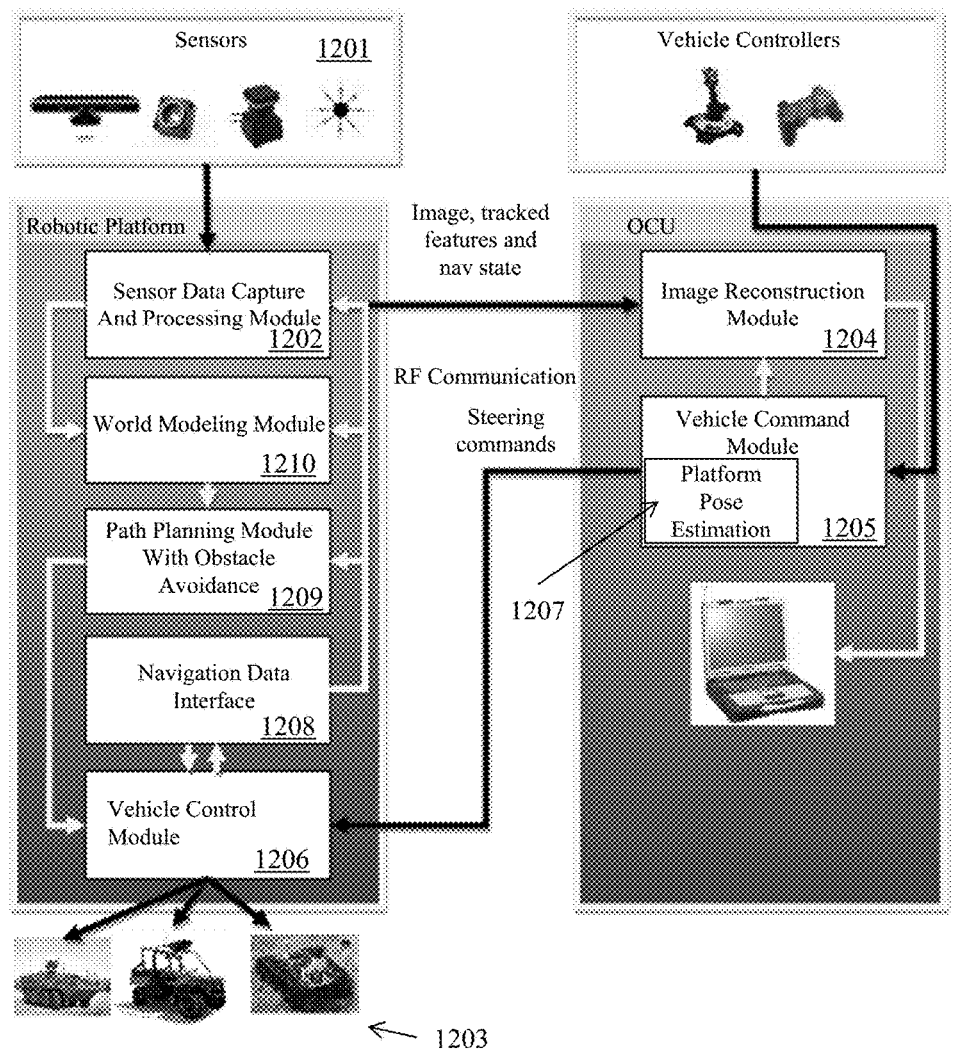
FIG. 12 illustrates the Sensor Data Capture and Processing Module on the platform extracts 3D feature locations from the sensor selected by the user.

As shown in FIG. 12, the Sensor Data Capture and Processing Module 1202 on the platform extracts 3D feature locations from the sensor 1201 selected by the user/operator. These tracked 3D features along with the current navigation state of the platform and a compressed image is sent back to the OCU.

The Sensor Data Capture and Processing Module 1202 runs on the platform. Each sensor 1201 that is added to the platform 1203 has its own sensor data processing class that communicates with the sensor 1201 band extract the feature information from that sensor. These sensor data processing classes support a generic sensor interface that is used by the rest of the system to access and distribute sensor data. This interface allows users to seamlessly swap sensors as well as add new sensors 1201 to the platform 1203 in the future and use them with DTA.

The image reconstruction module 1204 is a collection of algorithms that could be selected by the user to reconstruct synthetic images from the 3D feature locations obtained from the platform 1203. The inputs coming in from the platform 1203 for each algorithm is a set of 3D feature locations extracted from the sensor data, the navigation state of the platform when the data was collected, a compressed image from the camera at that moment in time and the last command that was executed on the platform. The inputs from the OCU itself are the current commands being sent to the platform from the Vehicle Command Module 1205. The output of each image reconstruction algorithm is a synthetic image that portrays the predicted state of the platform for each command sent to the platform.

A Vehicle Command Module 1206 provides an interface to send commands from joysticks or other devices to the Image Reconstruction Module 1204 as well as to the Vehicle Control Module 1205.

A Platform Pose Prediction sub module 1207 evaluates the commands sent to the platform on model of the platform and the world around the platform. The Platform Pose Prediction sub module estimates the new position of the platform given a command by taking into account the environment and the path following capabilities of the platform as well as the current system mode. This estimated position can be used by the Image Reconstruction module 1204 when creating the synthetic images shown to the operator instead of directly using the commands from the controller.

A Vehicle Control Module 1205 resides on the platform and can be used to talk to the platform's drive by wire interface. The Vehicle Control Module receives commands from the Vehicle Control Module 1250 on the OCU. The Vehicle Control Module sends back status to the Navigation Data Interface 1208.

A Navigation Data Interface 1208 provides system navigation state information to other modules running on the platform. A World Modeling Module 1210 receives data from the Sensor Data Capture and Processing Module 1202 as well as the Navigation Data Interface 1208. The Navigation Data Interface creates a 2.5D obstacle map of the environment around the platform. This map is used for Path Planning and Obstacle Avoidance and Path Planning Module with Obstacle Avoidance 1209. This module uses commands sent from the operator as a reference and evaluate other paths that might be better to get to a certain result and provide appropriate feedback to the operator. The operator can use this feedback to come up with a better route to tele-operate the vehicle. The Path Planning and Obstacle Avoidance and Path Planning Module with Obstacle Avoidance also has the capability to perform reactive obstacle avoidance.

The system provides buttons and sliders in the OCU that allows the operator to pick the sensor, system mode, and image reconstruction algorithm as well as control the amount of sensor data processing that is done on the platform. The OCU communicates with all other modules in the system both on the OCU and the platform.

The inventors refer to the process of creating new images based on current commands from delayed sensor data as synthetic image generation. The inventors have explored multiple Structure From Motion (SFM) based approaches as discussed above. The inventors plan to continue refining the promising approaches as well as evaluate some new modalities using different types of sensors.

It is possible to extract depth information from the sequences of imagery from a single camera. When performing sparse feature localization, only highly unique image patches were triangulated across images. The inventors continue to explore ways of increasing the density and accuracy of the generated 3D models.

The inventors started by generating Delaunay meshes from the estimated feature locations but the resulting images did not look smooth. The inventors noticed spikes in these synthetic images when the mesh had connected points at different depths in the same triangle. This indicated a problem with the way the mesh was being created and stretched to produce the synthetic images. Hence the inventors decided on evaluating thin plate splines as a solution to get rid of those unpleasing artifacts observed when using Delaunay meshes. As a less CPU intensive approach, the inventors also evaluated fitting one dimensional splines (curve fitting) to the depths of features passed to the OCU. This allowed the Inventors to draw a surface in OpenGL at depths based on the estimated curve thereby increasing the accuracy of the synthetic image. This would greatly increase the confidence and situational awareness of the operator. The inventors plan on refining our image reconstruction algorithms based on thin plate splines and curve fitting in Phase II and integrate them into our OCU.

As mentioned earlier, thin plate splines enable the Inventors to create smooth transitions between synthetic images created using predicted 3D feature locations. Thin plate splines are used in a various fields for the same reason. Thin plate splines are heavily used in biomedical image processing to estimate the shape of the various body parts and organs from sparse data sets. The main concept is that the original image is allowed to be deformed so that the original landmarks are moved to fit the new shape. Thin plate splines are a class of non-rigid spline mapping functions f (x, y) with several desirable properties for our application. Thin plate splines are globally smooth, easily computable and separable into affine and non-affine components. The thin plate spline is the two-dimensional analog of the cubic spline in one dimension and contains the least possible non-affine warping component to achieve the mapping. By the last statement, the inventors mean that the sum of squares of all second order partial derivatives i.e., the bending energy, is minimized. By using two separate thin plate spline functions fx and fy which model the displacement of the landmarks in the x and y direction the inventors arrive at a vector-valued function F=(fx, fy) which maps each point of the image into a new point in the image plane: (x, y)→(fx (x, y), fy (x, y)) [2]. This spline defines a global warping of space, and is therefore used to warp the entire source image onto the target shape.

Arigovindan et al propose a novel method for image reconstruction from non-uniform samples with no constraints on their locations. They adopt a variational approach where the reconstruction is formulated as the minimizer of a cost that is a weighted sum of two terms: 1) the sum of squared errors at the specified points and 2) a quadratic function that penalizes the lack of smoothness. They search for a solution that is a uniform spline and show how that solution can be determined by solving a large, sparse system of linear equations.

Arigovindan et al propose a novel 2D method to synthesize face images across pose from a single example. Starting from a training set of sparse face meshes, they built a Point Distribution Model and identify the eigenvectors which are responsible for controlling the apparent changes in shape due to turning and nodding the head, namely the pose eigenvectors. By modifying the values of their corresponding parameters, virtual meshes under different poses can be obtained and, using the correspondences between the original mesh and the virtual one, synthetic faces are generated via thin plate spline-based warping. Arigovindan et al also show that identity, as well as expressions, are not distorted in these synthetic faces.

Texture mapping typically refers to the process of geometrically transforming a given source image or pattern in order to simulate its mapping onto a three-dimensional surface. There are potentially two ways to do this: 1) applying the inverse transformation for each pixel position in the target image to get the interpolated value from the source image; 2) applying the transformation of each source pixel and using a nonuniform reconstruction method to get the target image. The second method has the clear advantage that it uses the information present in the source image completely, whereas there might be some loss of information with the first approach (unused pixels in the source image). This method gives the least squares fit in the regions where the input samples (transformed source pixels) outnumber the reconstruction grid points (target pixels). This reduces reconstruction artifacts. A key feature of this technique is that there are no aliasing artifacts and that the sharpness of the pictorial information is essentially preserved when is small.

Structured-light systems use triangulation to determine the structure of the environment in a very similar manner to traditional two-camera, passive stereo vision systems. A classic implementation of stereo vision technology consists of two calibrated cameras separated by a known distance viewing a common scene. To determine the structure of the environment, the pixel locations of common points in the scene are found in both images. For example the corner of a desk may be located at pixel location (30, 67) in the left camera and pixel location (30, 34) in the right camera. The difference in image locations is known as disparity or displacement. The difference in image locations is known as parallax and can be used to determine the location of image points relative to the camera system. One key thing to note about stereo vision systems is that the system relies on matching small image patches between the two cameras. The correspondence of pixels becomes very difficult in environments with uniform patches and smooth gradients (e.g., painted flat walls).

Stereo vision was intended to solve some of the cost issues associated with LADAR, but stereo vision adds new quirks of its own. Typically, stereo is not as accurate as LADAR because stereo does not take direct measurements of range.

Rather, stereo computes range based on associating pixels between two cameras and computing position based on triangulation. Pixel associations are found using features in the environment that are observed by both cameras.

Incorrect feature matches lead to erroneous depth estimates. Also, the distinguishable range resolution is constant for LADAR sensors, but degrades with the square of the distance from the cameras for stereo vision.

MICROSOFT's KINECT sensor does not require finding features in the environment for stereo processing; the KINECT avoids finding features by generating its own features (a process known as structured light) that are then used to triangulate and compute range. Because of this advantage, the KINECT shines in areas where conventional stereo vision has problems: featureless walls and the repeating patterns created by vegetation or paved roads.

The fundamental difference between structured light and stereo vision is that the second camera is replaced with a small light projector. A light pattern is projected onto the environment and sensed by a camera. The light pattern is known a priori and is detected in the camera's image. The camera/projector parallax causes distortion of the light pattern in the sensed image. This distortion provides a disparity estimate that can be used to triangulate points in the scene. The key advantage of structured-light over stereo vision is that disparity can be measured in scenes with little image texture. In addition, structured-light is typically not affected by low-light conditions since structured-light provides its own light source (the projected light pattern). However, structured-light can exhibit problems if the ambient light is much stronger than the projected light. Although KINECT doesn't work outdoors, other structured light ranging approaches can also be devised for outdoor purposes for larger vehicles.

Figure 13A:
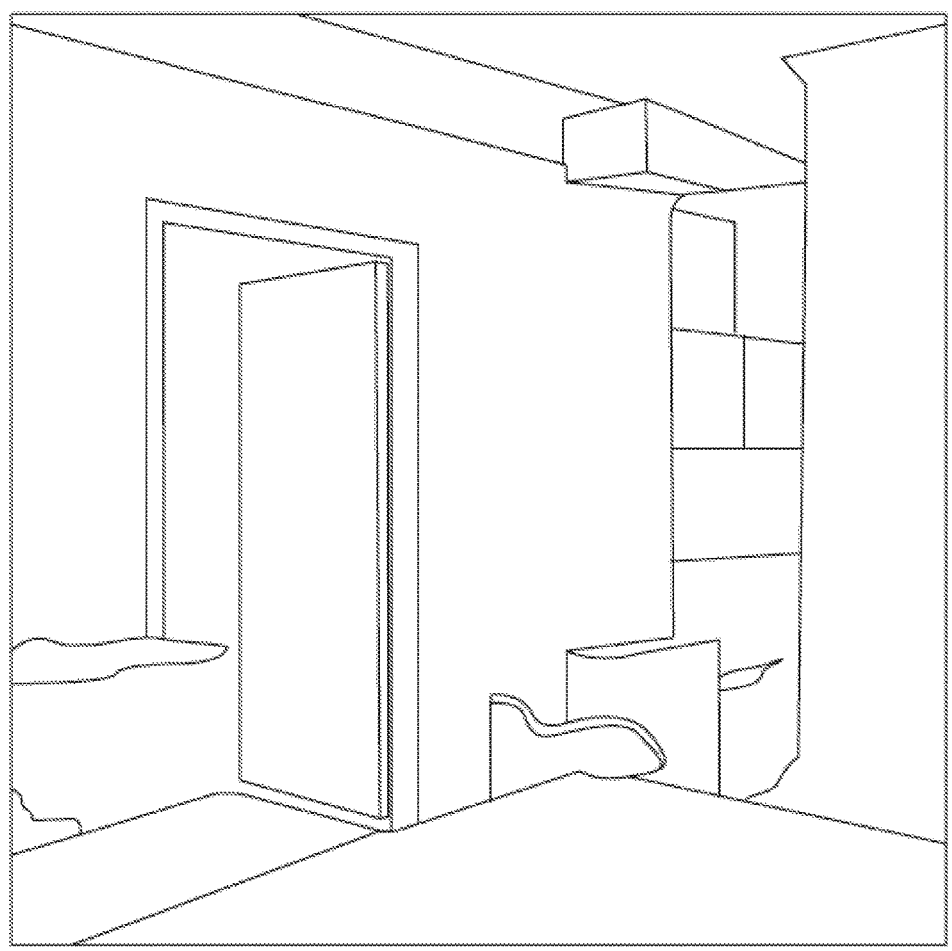
FIGS. 13A-C show two approaches to displaying the 3D environment.
Figure 13B:
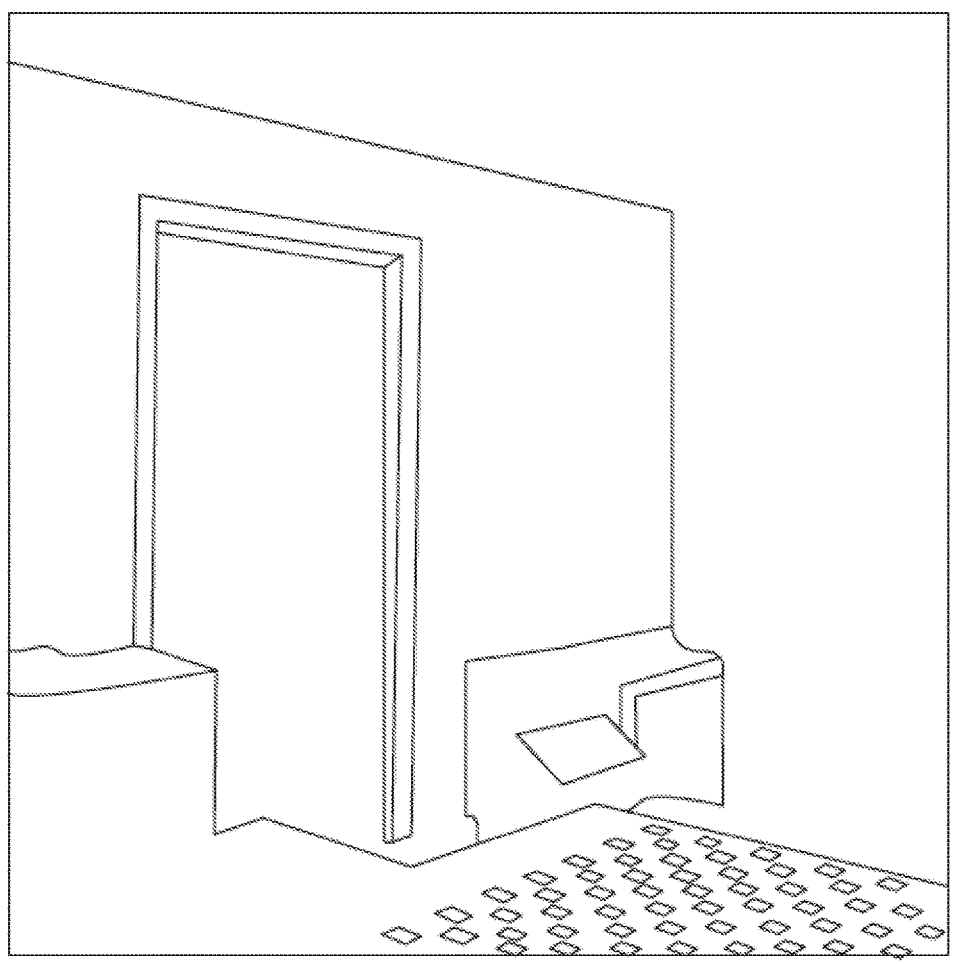
Figure 13C:
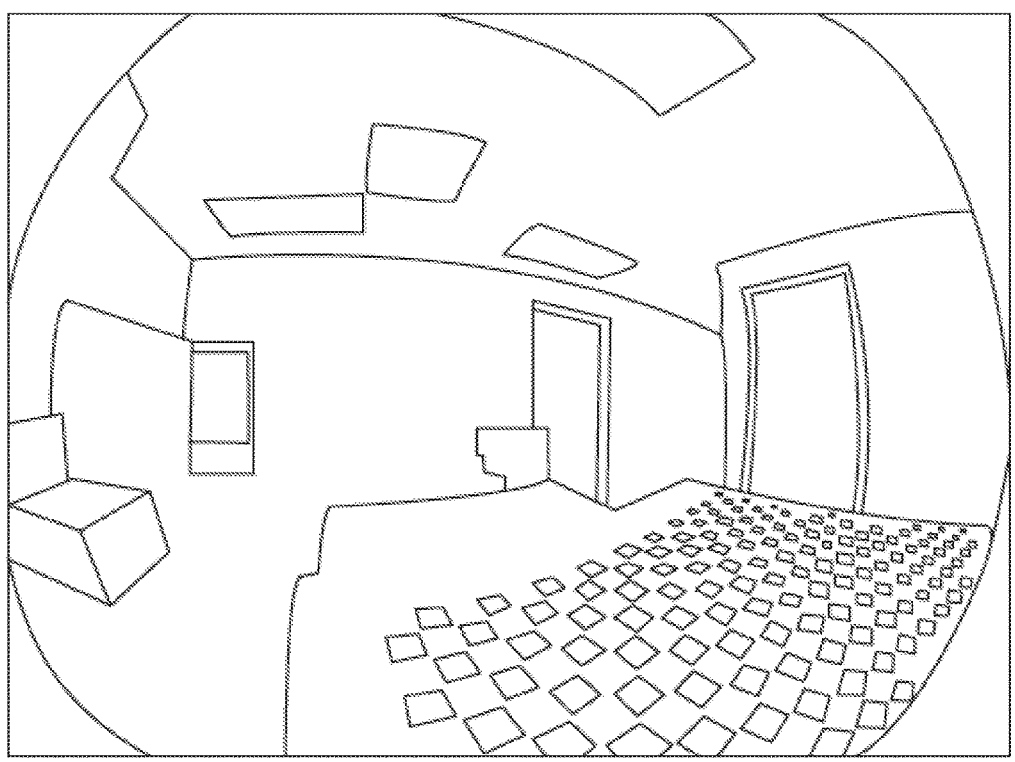

FIGS. 13a-c show two approaches to displaying the 3D environment. As part of the work for UMAPS, the inventors quickly discovered that the optimal display approach depends on the requirements of the user. If 3D surface detail is desired, the representation shown in FIG. 17a is ideal because 3D surface detail clearly shows all of the detail for each object in the environment. The textured surface on the right of FIG. 17a is ideal for enhancing the user's understanding of the environment.

It is important to note that the 3D mesh shown by the view in FIG. 13a is efficiently stored. All 3D point information is transformed into 3D triangles. Coplanar points are merged into similar surfaces. Thus, this representation creates a very compressed version of the 3D information (about a 20 to 1 compression ratio). This information is easy to store compared to raw point clouds and has the added benefit of being easy to compute.

Because of the compression, it is possible to wirelessly transmit these 3D surfaces to the users in real time.

Figure s 13a-c illustrate the 3D visualization of a single room. The 3D surfaces are generated from LADAR data. FIG. 13a illustrates a linked view between non-textured 3D data and the same 3D surface textured with image data shown in FIG. 13b. FIG. 13c illustrates a raw image of the scene captured using a fisheye lens. This image is used to texture the region shown in FIG. 13a and create the image shown in FIG. 13b.

The current UMAPS system utilizes the mixed set of visualizations shown in FIG. 17a, where camera position for the different displays is tied together. That is, if the position moves for one view (e.g., the texture mapped display), then the others (e.g., the 3D model) are moved in the same way. This approach has the benefit of maintaining 3D and texture information in an intuitive format and without needing to switch display modes. Moreover, the UMAPS visualization program allows the efficient display of very large scenes without sacrificing performance. These large scenes are shown by only drawing high resolution areas if the large scenes are close to the camera. For regions far from the camera, low resolution 3D information is drawn, which is much fewer triangles than the 3D surfaces. Moreover, the computations for what areas are close to the camera are very efficient because a spatial data structure is utilized.

The inventors also plan on experimenting with a low-cost method for estimating scene depth using a camera and a laser pointer rig similar to the one in the figure below. This setup is similar to the Kinect sensor where the inventors replace the structured light projector with cheap laser pointers. By detecting the laser points from another camera, the inventors can compute depths of the laser pointer locations in the scene. Basically the inventors are spraying features in the environment as the inventors go and tracking them.

Once the inventors have 3D locations of the laser points in the scene, the #d locations of the laser points in the scene are passed to the OCU. This information is used by the OpenGL based image reconstruction method to texture map the compressed image to the surface drawn at the depths associated with these laser points. By increasing the number of laser pointers, the inventors can increase the accuracy of our synthetic images. If the system has omni-directional cameras, the inventors can use a circular laser rig to estimate the depth of points around the platform. This might aid the operator when backing up the platform. The inventors used the method described to detect the laser points in the image.

The method consists of two main steps. The first is the computation of a difference image, the second the computation of a cross-correlation function. For the difference computation the inventors take a picture of the scene without laser points. Then, for the image containing laser points, the inventors compute the intensity difference in the red and green channels. Laser points in images usually do not appear as single bright pixels but rather as circular or oval regions several pixels in diameter with the intensity maximum in the middle and intensity quickly decreasing towards the boundary of the region. Since such an intensity distribution resembles a two-dimensional Gaussian quite well, the inventors chose to detect laser points by computing the cross-correlation of a Gaussian and the difference image. The present invention then detects the positions of a set of local cross-correlation maxima equal to the number of laser pointers and store them for further refinement. A simple non-maximum suppression around each detected point avoids false positives caused by nearby correlation maxima. The inventors also used the method discussed in to achieve sub-pixel accuracy.

A reactive scheme utilizes a sense-act coupling to navigate. Instead of creating a path or trajectory, a reactive navigation scheme creates steering and/or propulsion commands to react to a current snapshot of sensor data.

Similar to a closed loop feedback system, the robot acts, changes the world, and modifies the action in response to its current sensor measurements. Predictions of the robot's future or knowledge of its past are unused. The overall behavior is dictated by the series of commands (emergent behavior) rather than one single trajectory.

Since the sensing and acting is tightly coupled, the algorithm can operate extremely quickly. For example, no computation is needed to transform map data to the earth frame and no memory is required to store the map data from previous time steps. Instead, all sensor data, except for navigation data (e.g. GPS), is egocentric. Behaviors that use exteroceptive sensory data typically do not require complex manipulation of the data to make decisions. The data can retain its reference to the vehicle frame. Reactive behaviors typically have low computational complexity, often on the order of $O(n)$.

The Vector Field Histogram (VFH+) algorithm was originally developed by Johann Borenstein at University of Michigan. In our system, VFH uses a one-dimensional ego-polar histogram, which is continuously updated every cycle by the SFM module. The ego-polar histogram is constructed with the polar origin centered on the vehicle. The histogram contains an obstacle density value at each corresponding angular direction. The desired steering direction is then determined by calculating the optimal angular direction in the histogram.

SFM module outputs a two-dimensional image (C) with range estimate and confidence value for each pixel. This data is then reduced into a two-dimensional polar domain (P) as shown in FIG. 19. Each column in the image domain is a one for one mapping to a wedge in the polar domain. The object density for each wedge of the polar domain is calculated using $$m_\theta = \sum_{i=0}^{n} \left[ c_i^2 \left( 1 - \frac{d_i}{d_{max}} \right) \right],$$

where: $m\theta$ is object density at a specific angular position, i is the object number, n is the number of objects, di is distance to corresponding obstacle, dmax is maximum distance threshold, and ci is confidence of corresponding obstacle.

This ego-polar histogram is an alternative to constructing a world map in the global frame. The histogram data structure provides an efficient means for fusing the range data with the range confidence. The ability to fuse confidence into the data structure allows the system to utilize coarser obstacle estimates to navigate the robot.

Unlike a deliberative scheme, the system is capable of utilizing coarser measurements from the SFM module rather than requiring very dense, accurate range data from expensive, large range sensors, such as LADAR. This is a very hard problem due to very small subpixel motion between frames for these objects. The scene depth is estimated from the scaling of supervised image regions. The system then generates obstacle hypotheses from these depth estimates in image space.

A second step then performs testing of these by comparing with the counter hypothesis of a free driveway. The approach can detect obstacles already at distances of 50 m and more with a standard focal length. This early detection can allow the system to react in time to avoid the collision. The inventors plan to investigate similar approaches for outdoor high speed teleoperation even if the latency is pretty low. This kind of a safety system will increase the teleoperator's confidence in achieving mission success.

One possible mode for the enhanced teleoperation system would to use the commands coming down from the OCU to the platform as a long range plan and use the local planner on the platform to generate navigation commands for the platform. The local planner is aware of the terrain and obstacles in its surroundings and can plan around these obstacles and hazardous terrain. The planner can also provide feedback to the operator.

The operator will still have final control over the system but the system will be able to take certain decisions by itself.

The Path Planning and Obstacle Avoidance Module's function is to generate trajectories for the UGV, avoiding obstacles while trying to follow the commands generated from the OCU. The module resides on each platform. The path planner's input is a 3D representation of its vicinity in a relative coordinate frame; the Path Planning and Obstacle Avoidance Module outputs a trajectory to be followed by the Vehicle Control Module.

Thus, it is appreciated that the optimum dimensional relationships for the parts of the invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the invention should be determined by the appended claims and their legal equivalents, rather than by the examples given.

The embodiments of the invention in which an exclusive property or privilege is claimed are defined as follow:

1. A method for the teleoperation of robots, stored and executed by a computer platform, comprising the steps of:
   predicting robot motion from an operator's queued commands to an Operator Control Unit (OCU);
   creating synthetic images to produce a video feed that looks as if the robot communication link had no delay and no reduced bandwidth;
   controlling the robot's movement using closed loop; and
   displaying the synthetic image to an operator
   creating a 3D model of the environment;
   accurately controlling the vehicle to the predicted pose;
   providing an OpenGL based image reconstruction algorithm;
   providing a command interface to the robot for receiving distance and yaw input commands;
   dividing the required image processing between the vehicle and the OCU, taking into consideration the video quality and computational assets available;
   wherein the algorithm is chosen from one of the following for the group comprising:
   SIFT;
   a SURF feature for detection and tracking;
   Lucas-Kanade method;
   combined SURF feature tracking with Delaunay mesh generation;
   Kalman filtering techniques; and
   thin plate spline interpolation and curve fitting for synthetic image reconstruction;
   extracting SURF features for every frame;
   projecting SURF features from the image into the world frame using navigation data and our fish-eye camera model;
   performing ray intersection checks in 3D to determine if the ray originating at the camera location goes through the feature location in world frame;
   comparing each feature in the last frame is with every feature in the current frame;
   if the rays are close enough, a 3D location for that feature is computed;
   comparing the similarity of the SURF descriptors of the features in question, to each other, to increase the tracking accuracy; and
   if both conditions are satisfied, the track is considered good and added as a node to be used during an image reconstruction phase.

2. The method of claim 1, wherein
   the closed loop control of the robot makes sure that the predicted pose after the delay, and therefore the image presented to the operator, is achieved by the robot.

3. The method of claim 1, wherein
   the work to perform these tasks is split between two sets of computing hardware, one at the robot and the second at the OCU.

4. The method of claim 1, further comprising the steps of
   extracting sufficient information about the structure of the scene using image flow and other sensor specific techniques to reconstruct a useful predicted view of the world at a future point in time;
   using this reconstruction as a teleoperation aid;
   making it appear that the communication delay between the OCU and the robot does not exist;

creating the illusion that the operator is directly controlling the vehicle without the significant video and control delays; and the feedback the operator receives from the video display would respond immediately to his actions.

5. The method of claim 4, further comprising the steps of generating predicted synthetic images;

once the features were identified and tracked from one frame to the next;

using these tracked features to create future synthetic video frames; and generating a simple OpenGL based simulated display integrated with the OCU and a real robot.

6. The method of claim 1, wherein one or more image reconstruction techniques are chosen from the group comprising: Delaunay mesh generation, thin plate spline interpolation, and curve fitting.

7. The method of claim 1, further comprising the steps of collecting raw Bayer images (1260×980) with GMT timestamps at 5 Hz;

collecting the (x, y, z) location and (r, p, y) orientation of the robot along with GMT timestamps at 50 Hz; and applying the appropriate coordinate transform to the robot location to obtain the camera location and orientation.

8. The method of claim 1, further comprising the steps of: checking for mismatched SURF descriptors; and only allowing pixels with shifts in the image to pass through.

9. The method of claim 8, further comprising the steps of: using a Kalman filter for each feature being tracked to improve the estimate of its 3D location using its past history;

the Kalman filter is initialized with a best estimate of the 3D location of the feature;

each iteration the filter is updated using the (x, y) location of the tracked pixel in the current image;

internally, the filter keeps track of the 3D state (x, y, z) of the feature and updates it based on recorded measurements;

at each iteration the filter is updated using the (x, y) location of the tracked pixel in the current image;

internally, the filter keeps track of the 3D state (x, y, z) of the feature and updates it based on recorded measurements;

the 3D locations of the tracked features can be sent to the OCU along with the compressed image and the associated navigation state information of the robot;

creating a synthetic image using one or more of the image reconstruction techniques.

10. The method of claim 9, further comprising the steps of:

interpolating surrounding flow vectors;

generating a triangular Delaunay mesh connecting the image features with known optical flow vectors;

the regions between are mapped onto triangular regions; this surface, with the decompressed image from the robot texture mapped to it, will then be deformed to produce the reconstructed image for the operator to drive by; and the predicted future locations of the tracked features are used to deform the Delaunay mesh.

11. The method of claim 10, further comprising the steps of:

as the operator steers, additional commands go into a history queue and to the vehicle itself;

to simulate these commands when working with recorded data, future navigation data is read from collected datasets;

this produces a new future vehicle position estimate, and a new view position estimate for each feature in the current image;

the image is treated as a rubber sheet with the locations of the tracked image features as the control points;

when the image features are repositioned in the field of view based on the vehicle motion prediction, the portions of the image not directly associated with image features are interpolated based on the new positions of the points in the triangular mesh;

the compressed image is texture mapped onto this warped surface;

these images are then displayed on the screen.

12. The method of claim 1, further comprising the steps of:

a point on the mesh close to the source feature will be moved to a place close to the corresponding target feature location;

the points in between are interpolated smoothly using Bookstein's thinplate spline algorithm;

generating two lists consisting of the pixel locations of the tracked features in the current image and the predicted future 2D pixel locations of the tracked features;

the predicted future pixel locations of the tracked features are computed by projecting the 3D feature location back into the synthetic 2D image using the world-to-image transformation provided by the camera model using the predicted navigation state of the robot;

the coefficients of an interpolated cubic function are computed;

once the parameters are estimated, new (x, y) locations of all the pixels in the synthetic future image are computed;

this image is then texture mapped to a surface in OpenGL and displayed to the operator.

13. The method of claim 12, wherein the bending of a thin plate can be controlled using a Rigidity parameter.

14. A method for the teleoperation of robots, stored and executed by a computer platform, comprising the steps of:

predicting robot motion given a operator's commands;

creating synthetic images to produce a video feed that looks as if the robot communication link had no delay and no reduced bandwidth;

controlling the robot's movement using closed loop;

sending the robot desired odometer and yaw commands from a joystick;

taking the last video frame received from the robot and texture mapping it on a flat surface;

using the predicted pose of the robot, computed using the commands sent to the robot from an Operator Control Unit (OCU);

using orthographic projection;

displaying the synthetic image to the operator;

the odometer and yaw commands sent to the robot using the joystick are queued up in the OCU along with a timestamp;

an image reconstruction module has direct access to this queue of commands and uses the commands right away to provide instant feedback to the operator by creating predicted synthetic frames based on those commands and the last video frame/vehicle status received from the robot;

the video frames and vehicle status messages received from the robot are also queued up in the OCU;

in order to simulate latency, the camera frames are sent to the image reconstruction module after a predefined time interval has passed from the time they are taken;

this delay threshold is configurable to simulate different latencies;

when the image reconstruction module receives a new frame, the corresponding vehicle status message is found by matching the frame id stored in the vehicle status message; and this correction in pose is used when the inventors generate the next synthetic image for the operator.

15. The method of claim 14, further comprising:

a Sensor Data Capture and Processing Module running on the robot;

a Vehicle Command Module provides an interface to send commands from joysticks or other devices to the Image Reconstruction Module as well as to the Vehicle Control Module;

a robot Pose Prediction sub module evaluates the commands sent to the robot on model of the robot and the world around the robot;

a Vehicle Control Module resides on the robot and can be used to talk to the robot's drive by wire interface;

a Navigation Data Interface provides system navigation state information to other modules running on the robot; and a World Modeling Module will receive data from the Sensor Data Capture and Processing Module as well as the Navigation Data Interface.

* * * * *

UNITED STATES PATENT AND TRADEMARK OFFICE
CERTIFICATE OF CORRECTION

| | |
|---|---|
| PATENT NO. | : 9,519,286 B2 |
| APPLICATION NO. | : 14/219834 |
| DATED | : December 13, 2016 |
| INVENTOR(S) | : Alberto Daniel Lacaze, Karl Murphy and Karl Kluge |

It is certified that error appears in the above-identified patent and that said Letters Patent is hereby corrected as shown below:

In the Specification

Please ADD, immediately following the "CROSS-REFERENCE TO RELATED APPLICATIONS" Section at Column 1, Line 12, a NEW SECTION as follows:
STATEMENT REGARDING FEDERALLY SPONSORED RESEARCH
This invention was made with government support under Contract No. W56HZV-15-C-0148, awarded by the U.S. Army Contracting Command. The government has certain rights in the invention.

Signed and Sealed this
Fourth Day of June, 2024

Katherine Kelly Vidal
*Director of the United States Patent and Trademark Office*